US008144596B2

(12) United States Patent
Veillette

(10) Patent No.: US 8,144,596 B2
(45) Date of Patent: Mar. 27, 2012

(54) COMMUNICATION AND MESSAGE ROUTE OPTIMIZATION AND MESSAGING IN A MESH NETWORK

(75) Inventor: Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 46 days.

(21) Appl. No.: 12/275,238

(22) Filed: Nov. 21, 2008

(65) Prior Publication Data

US 2009/0135716 A1 May 28, 2009

Related U.S. Application Data

(60) Provisional application No. 60/989,957, filed on Nov. 25, 2007, provisional application No. 60/989,967, filed on Nov. 25, 2007, provisional application No. 60/989,958, filed on Nov. 25, 2007, provisional application No. 60/989,964, filed on Nov. 25, 2007, provisional application No. 60/989,950, filed on Nov. 25, 2007, provisional application No. 60/989,953, filed on Nov. 25, 2007, provisional application No. 60/989,975, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,954, filed on Nov. 25, 2007, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/094,116, filed on Sep. 4, 2008.

(51) Int. Cl.
*H04L 12/26* (2006.01)

(52) U.S. Cl. ............... 370/238; 370/395.21; 370/395.32; 709/241

(58) Field of Classification Search .......... 370/217–220, 370/221, 254, 255, 351, 389, 390, 395.2, 370/395.21, 395.3, 227–228, 238, 395.32; 709/238–244; 398/126

See application file for complete search history.

(56) References Cited

U.S. PATENT DOCUMENTS 4,132,981 A  1/1979  White .......................... 340/203

(Continued)

FOREIGN PATENT DOCUMENTS

EP          0 578 041 B1      11/1999

(Continued)

OTHER PUBLICATIONS

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

(Continued)

*Primary Examiner* — Jeffrey M Rutkowski

(74) *Attorney, Agent, or Firm* — Dawn-Marie Bey; King & Spalding LLP

(57) ABSTRACT

A method and system facilitate communications between an unassociated device and a server via a mesh network and a wide area network. The method may include receiving transmissions from candidate proxy devices, wherein each candidate proxy device is associated with a mesh network. The method may include selecting a proxy device from the candidate proxy devices. The method may include communicating with a server via the proxy device and the associated mesh network.

55 Claims, 9 Drawing Sheets

U.S. PATENT DOCUMENTS

| | | | |
|---|---|---|---|
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,644,320 A | 2/1987 | Carr et al. | 340/12.37 |
| 4,749,992 A | 6/1988 | Fitzemeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A * | 10/1995 | Bialkowski et al. | 709/238 |
| 5,465,398 A | 11/1995 | Flammer | 455/69 |
| 5,467,345 A | 11/1995 | Cutler, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Ritter et al. | 370/338 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,696,501 A | 12/1997 | Ouellette et al. | 340/870.02 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/229 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestican | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,577,671 B1 | 6/2003 | Vimpari | 375/146 |
| 6,606,708 B1 | 8/2003 | Shifrin et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |
| 6,684,245 B1 | 1/2004 | Shuey et al. | 709/223 |
| 6,691,173 B2 | 2/2004 | Morris et al. | 709/249 |
| 6,697,331 B1 | 2/2004 | Riihinen et al. | 370/236 |

| Patent | Date | Inventor | Class |
|---|---|---|---|
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Meyer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Davis et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.3 |
| 7,170,425 B2 | 1/2007 | Christopher et al. | 340/870.02 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,231,482 B2 | 6/2007 | Leach | 710/305 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 * | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 * | 8/2008 | Suemura | 709/239 |
| 7,427,927 B2 | 9/2008 | Borleske et al. | 340/870.02 |
| 7,451,019 B2 | 11/2008 | Rodgers | 700/295 |
| 7,457,273 B2 * | 11/2008 | Nakanishi et al. | 370/389 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.03 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,756,538 B2 | 7/2010 | Bonta et al. | 455/517 |
| 7,814,322 B2 | 10/2010 | Gurevich et al. | 713/171 |
| 7,847,706 B1 | 12/2010 | Ross et al. | 340/12.52 |
| 2001/0005368 A1 | 6/2001 | Rune | 370/390 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 * | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |

| | | | |
|---|---|---|---|
| 2003/0001754 A1 | 1/2003 | Johnson et al. ............ 340/870.02 |
| 2003/0033394 A1 | 2/2003 | Stine ............................. 709/222 |
| 2003/0037268 A1 | 2/2003 | Kistler ........................... 713/310 |
| 2003/0050737 A1 | 3/2003 | Osann, Jr. ...................... 700/276 |
| 2003/0112822 A1 | 6/2003 | Hong et al. .................... 370/469 |
| 2003/0117966 A1 | 6/2003 | Chen .............................. 370/255 |
| 2003/0122686 A1 | 7/2003 | Ehrke et al. ............... 340/870.02 |
| 2003/0123481 A1 | 7/2003 | Neale et al. .................... 370/466 |
| 2003/0156715 A1 | 8/2003 | Reeds, III et al. ................. 380/37 |
| 2003/0229900 A1 | 12/2003 | Reisman .......................... 725/87 |
| 2003/0233201 A1 | 12/2003 | Horst et al. ..................... 702/62 |
| 2004/0008663 A1* | 1/2004 | Srikrishna et al. ............. 370/351 |
| 2004/0031030 A1 | 2/2004 | Kidder et al. .................. 717/172 |
| 2004/0034773 A1 | 2/2004 | Balabine et al. ............... 713/168 |
| 2004/0056775 A1 | 3/2004 | Crookham et al. ............ 340/825 |
| 2004/0066310 A1 | 4/2004 | Ehrke et al. ............... 340/870.02 |
| 2004/0077341 A1 | 4/2004 | Chandranmenon et al. .. 455/418 |
| 2004/0081086 A1* | 4/2004 | Hippelainen et al. ......... 370/227 |
| 2004/0082203 A1 | 4/2004 | Logvinov et al. ................ 439/10 |
| 2004/0100953 A1* | 5/2004 | Chen et al. ..................... 370/389 |
| 2004/0113810 A1 | 6/2004 | Mason, Jr. et al. ........ 340/870.02 |
| 2004/0117788 A1 | 6/2004 | Karaoguz et al. .............. 717/177 |
| 2004/0125776 A1 | 7/2004 | Haugli et al. ................... 370/338 |
| 2004/0138787 A1 | 7/2004 | Ransom et al. ................ 700/295 |
| 2004/0140908 A1 | 7/2004 | Gladwin et al. ........... 340/870.02 |
| 2004/0157613 A1 | 8/2004 | Steer et al. ..................... 455/446 |
| 2004/0183687 A1 | 9/2004 | Petite et al. .................... 340/601 |
| 2004/0185845 A1 | 9/2004 | Abhishek et al. ............ 455/422.1 |
| 2004/0210544 A1 | 10/2004 | Shuey et al. ................... 705/412 |
| 2005/0026569 A1 | 2/2005 | Lim et al. ......................... 455/73 |
| 2005/0027859 A1 | 2/2005 | Alvisi et al. .................... 709/224 |
| 2005/0030968 A1 | 2/2005 | Rich et al. ...................... 370/449 |
| 2005/0033967 A1 | 2/2005 | Morino et al. ................. 713/182 |
| 2005/0055432 A1 | 3/2005 | Rodgers ......................... 709/223 |
| 2005/0058144 A1 | 3/2005 | Ayyagari et al. ............... 370/401 |
| 2005/0065742 A1 | 3/2005 | Rodgers ............................. 702/62 |
| 2005/0122944 A1 | 6/2005 | Kwon et al. .................... 370/338 |
| 2005/0136972 A1 | 6/2005 | Smith et al. ................. 455/554.1 |
| 2005/0172024 A1 | 8/2005 | Cheifot et al. ................. 709/225 |
| 2005/0201397 A1 | 9/2005 | Petite ............................. 370/401 |
| 2005/0243867 A1 | 11/2005 | Petite ............................. 370/474 |
| 2005/0249113 A1* | 11/2005 | Kobayashi et al. ............ 370/219 |
| 2005/0251403 A1 | 11/2005 | Shuey ................................. 705/1 |
| 2005/0257215 A1 | 11/2005 | Denby et al. ................... 717/172 |
| 2005/0270173 A1 | 12/2005 | Boaz .......................... 340/870.02 |
| 2005/0276243 A1 | 12/2005 | Sugaya et al. .................. 370/328 |
| 2005/0286440 A1 | 12/2005 | Strutt et al. .................... 370/253 |
| 2006/0028355 A1 | 2/2006 | Patterson et al. ......... 340/870.02 |
| 2006/0055432 A1 | 3/2006 | Shimokawa et al. ............. 327/5 |
| 2006/0056363 A1 | 3/2006 | Ratiu et al. ..................... 370/338 |
| 2006/0056368 A1 | 3/2006 | Ratiu et al. ..................... 370/338 |
| 2006/0077906 A1 | 4/2006 | Maegawa et al. .............. 370/254 |
| 2006/0087993 A1 | 4/2006 | Sengupta et al. .............. 370/310 |
| 2006/0098576 A1 | 5/2006 | Brownrigg et al. ............ 370/238 |
| 2006/0098604 A1 | 5/2006 | Flammer, III et al. ........ 370/337 |
| 2006/0111111 A1 | 5/2006 | Ovadia ........................... 455/439 |
| 2006/0140135 A1 | 6/2006 | Bonta et al. .................... 370/254 |
| 2006/0146717 A1* | 7/2006 | Conner et al. .................. 370/238 |
| 2006/0158347 A1 | 7/2006 | Roche et al. .............. 340/870.02 |
| 2006/0161310 A1 | 7/2006 | Lal ................................. 700/295 |
| 2006/0167784 A1 | 7/2006 | Hoffberg .......................... 705/37 |
| 2006/0184288 A1 | 8/2006 | Rodgers ......................... 700/295 |
| 2006/0215583 A1 | 9/2006 | Castagnoli ..................... 370/254 |
| 2006/0215673 A1 | 9/2006 | Olvera-Hernandez ........ 370/406 |
| 2006/0217936 A1 | 9/2006 | Mason et al. ................... 702/188 |
| 2006/0230276 A1 | 10/2006 | Nochta ........................... 713/176 |
| 2006/0271244 A1 | 11/2006 | Cumming et al. ............. 700/291 |
| 2006/0271678 A1 | 11/2006 | Jessup et al. ................... 709/224 |
| 2007/0001868 A1 | 1/2007 | Boaz .......................... 340/870.02 |
| 2007/0013547 A1 | 1/2007 | Boaz .......................... 340/870.02 |
| 2007/0019598 A1 | 1/2007 | Prehofer ......................... 370/338 |
| 2007/0036353 A1 | 2/2007 | Reznik et al. .................... 380/30 |
| 2007/0057767 A1 | 3/2007 | Sun et al. ........................ 340/7.35 |
| 2007/0060147 A1 | 3/2007 | Shin et al. ...................... 455/445 |
| 2007/0063868 A1 | 3/2007 | Borleske .................... 340/870.03 |
| 2007/0085700 A1 | 4/2007 | Walters et al. ............ 340/870.02 |
| 2007/0087756 A1 | 4/2007 | Hoffberg ........................ 455/450 |
| 2007/0103324 A1 | 5/2007 | Kosuge et al. ................. 340/618 |
| 2007/0109121 A1 | 5/2007 | Cohen ........................ 340/539.26 |
| 2007/0110024 A1* | 5/2007 | Meier ............................. 370/351 |
| 2007/0120705 A1 | 5/2007 | Kiiskila et al. ............ 340/870.02 |
| 2007/0136817 A1 | 6/2007 | Nguyen ............................ 726/26 |
| 2007/0139220 A1 | 6/2007 | Mirza et al. ............... 340/870.02 |
| 2007/0143046 A1 | 6/2007 | Budike ............................. 702/62 |
| 2007/0147268 A1 | 6/2007 | Kelley et al. ................... 370/254 |
| 2007/0169074 A1 | 7/2007 | Koo et al. ....................... 717/168 |
| 2007/0169075 A1 | 7/2007 | Lill et al. ........................ 717/168 |
| 2007/0169080 A1 | 7/2007 | Friedman ....................... 717/168 |
| 2007/0177538 A1 | 8/2007 | Christensen et al. .......... 370/328 |
| 2007/0177576 A1 | 8/2007 | Johansen et al. ............... 370/351 |
| 2007/0177613 A1 | 8/2007 | Shorty et al. ................... 370/401 |
| 2007/0189249 A1 | 8/2007 | Gurevich et al. .............. 370/338 |
| 2007/0200729 A1 | 8/2007 | Borleske et al. ........... 340/870.02 |
| 2007/0201504 A1 | 8/2007 | Christensen et al. .......... 370/437 |
| 2007/0204009 A1 | 8/2007 | Shorty et al. ................... 709/218 |
| 2007/0205915 A1 | 9/2007 | Shuey et al. ............... 340/870.02 |
| 2007/0206503 A1 | 9/2007 | Gong et al. .................... 370/238 |
| 2007/0206521 A1 | 9/2007 | Osaje ............................. 370/315 |
| 2007/0207811 A1 | 9/2007 | Das et al. ....................... 455/450 |
| 2007/0210933 A1 | 9/2007 | Leach ....................... 340/870.02 |
| 2007/0211636 A1* | 9/2007 | Bellur et al. ................... 370/238 |
| 2007/0239477 A1 | 10/2007 | Budike ........................... 705/412 |
| 2007/0248047 A1 | 10/2007 | Shorty et al. ................... 370/329 |
| 2007/0257813 A1 | 11/2007 | Vaswani et al. ........... 340/870.02 |
| 2007/0258508 A1 | 11/2007 | Werb et al. ..................... 375/140 |
| 2007/0263647 A1 | 11/2007 | Shorty et al. ................... 370/406 |
| 2007/0265947 A1 | 11/2007 | Schimpf et al. .................. 705/35 |
| 2007/0266429 A1 | 11/2007 | Ginter et al. ..................... 726/12 |
| 2007/0271006 A1 | 11/2007 | Golden et al. ................. 700/295 |
| 2007/0276547 A1 | 11/2007 | Miller ............................ 700/295 |
| 2008/0018492 A1 | 1/2008 | Ehrke et al. ............... 340/870.03 |
| 2008/0024320 A1 | 1/2008 | Ehrke et al. ............... 340/870.02 |
| 2008/0031145 A1 | 2/2008 | Ethier et al. ................... 370/248 |
| 2008/0032703 A1 | 2/2008 | Krumm et al. .............. 455/456.1 |
| 2008/0037569 A1 | 2/2008 | Werb et al. ..................... 370/406 |
| 2008/0042874 A1 | 2/2008 | Rogai ........................ 340/870.03 |
| 2008/0046388 A1 | 2/2008 | Budike ........................... 705/412 |
| 2008/0048883 A1 | 2/2008 | Boaz ......................... 340/870.02 |
| 2008/0051036 A1 | 2/2008 | Vaswani et al. .................. 455/69 |
| 2008/0063205 A1 | 3/2008 | Braskich et al. ............... 380/270 |
| 2008/0068217 A1 | 3/2008 | Van Wyk et al. ......... 340/870.11 |
| 2008/0068994 A1 | 3/2008 | Garrison Stuber et al. ... 370/230 |
| 2008/0068996 A1 | 3/2008 | Clave et al. ................. 370/230.1 |
| 2008/0086560 A1 | 4/2008 | Monier et al. ................. 709/224 |
| 2008/0089314 A1 | 4/2008 | Meyer et al. ................... 370/349 |
| 2008/0095221 A1 | 4/2008 | Picard ............................ 375/224 |
| 2008/0097782 A1 | 4/2008 | Budike ........................... 705/1.1 |
| 2008/0107034 A1* | 5/2008 | Jetcheva et al. ................ 370/238 |
| 2008/0117110 A1 | 5/2008 | Luglio et al. ................... 343/702 |
| 2008/0129538 A1 | 6/2008 | Vaswani et al. ........... 340/870.03 |
| 2008/0130535 A1 | 6/2008 | Shorty et al. ................... 370/310 |
| 2008/0130562 A1 | 6/2008 | Shorty et al. ................... 370/329 |
| 2008/0132185 A1 | 6/2008 | Elliott et al. ................ 455/115.4 |
| 2008/0136667 A1 | 6/2008 | Vaswani et al. ........... 340/870.02 |
| 2008/0151795 A1 | 6/2008 | Shorty et al. ................... 370/310 |
| 2008/0151824 A1 | 6/2008 | Shorty et al. ................... 370/329 |
| 2008/0151825 A1 | 6/2008 | Shorty et al. ................... 370/329 |
| 2008/0151826 A1 | 6/2008 | Shorty et al. ................... 370/329 |
| 2008/0151827 A1 | 6/2008 | Shorty et al. ................... 370/329 |
| 2008/0154396 A1 | 6/2008 | Shorty et al. ..................... 700/90 |
| 2008/0159213 A1 | 7/2008 | Shorty et al. ................... 370/329 |
| 2008/0165712 A1 | 7/2008 | Shorty et al. ................... 370/310 |
| 2008/0170511 A1 | 7/2008 | Shorty et al. ................... 370/254 |
| 2008/0177678 A1 | 7/2008 | Di Martini et al. ............ 705/512 |
| 2008/0180274 A1 | 7/2008 | Cumeralto et al. ....... 340/870.02 |
| 2008/0181133 A1* | 7/2008 | Thubert et al. ................. 370/255 |
| 2008/0183339 A1 | 7/2008 | Vaswani et al. ................ 700/297 |
| 2008/0186202 A1 | 8/2008 | Vaswani et al. ........... 340/870.03 |
| 2008/0186203 A1 | 8/2008 | Vaswani et al. ........... 340/870.11 |
| 2008/0187001 A1 | 8/2008 | Vaswani et al. ................ 370/466 |
| 2008/0187116 A1 | 8/2008 | Reeves et al. .............. 379/106.09 |
| 2008/0189415 A1 | 8/2008 | Vaswani et al. ................ 709/226 |
| 2008/0189436 A1 | 8/2008 | Vaswani et al. ................ 709/242 |
| 2008/0204272 A1 | 8/2008 | Ehrke et al. ............... 340/870.02 |
| 2008/0205355 A1* | 8/2008 | Liu et al. ........................ 370/254 |
| 2008/0224891 A1 | 9/2008 | Ehrke et al. ............... 340/870.02 |
| 2008/0225737 A1 | 9/2008 | Gong et al. .................... 370/252 |
| 2008/0238714 A1 | 10/2008 | Ehrke et al. ............... 340/870.02 |

| Publication No. | Date | Inventor | Class |
|---|---|---|---|
| 2008/0238716 A1 | 10/2008 | Ehrke et al. | 340/870.03 |
| 2008/0272934 A1 | 11/2008 | Wang et al. | 340/870.11 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1* | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0134969 A1 | 5/2009 | Veillette | 340/3.1 |
| 2009/0135716 A1 | 5/2009 | Veillette | 370/328 |
| 2009/0135843 A1* | 5/2009 | Veillette | 370/406 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo Iii et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | Van Greunen et al. | 370/410 |
| 2009/0262642 A1 | 10/2009 | Van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | Van Greunen et al. | 370/350 |
| 2010/0060259 A1 | 3/2010 | Vaswani et al. | 324/86 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |

FOREIGN PATENT DOCUMENTS

| | | |
|---|---|---|
| EP | 0 663 746 B1 | 1/2003 |
| EP | 0 812 502 B1 | 8/2004 |
| EP | 0 740 873 B1 | 12/2005 |
| JP | 10-070774 | 3/1998 |
| JP | 10-135965 | 5/1998 |
| WO | WO 95/12942 | 5/1995 |
| WO | WO 96/10307 | 4/1996 |
| WO | WO 96/10307 A1 | 4/1996 |
| WO | WO 00/54237 A1 | 9/2000 |
| WO | WO 01/26334 A2 | 4/2001 |
| WO | WO 01/55865 A1 | 8/2001 |
| WO | WO 03/015452 | 2/2003 |
| WO | WO 2005/091303 | 9/2005 |
| WO | WO 2006/059195 | 6/2006 |
| WO | WO 2007/015822 | 8/2007 |
| WO | WO2007015822 * | 8/2007 |
| WO | WO 2007/132473 | 11/2007 |
| WO | WO 2008/027457 | 3/2008 |
| WO | WO 2008/033287 A2 | 3/2008 |
| WO | WO 2008/033514 A2 | 3/2008 |
| WO | WO 2008/038072 | 4/2008 |
| WO | WO 2008/092268 A1 | 8/2008 |

OTHER PUBLICATIONS

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13032, dated May 12, 2009, 14 pp.

International Search Report and Written Opinion for Application No. PCT/US08/13026, dated Feb. 24, 2009, 9 pp.

International Search Report and Written Opinion for Application No. PCT/US08/13029, dated Feb. 2, 2009, 8 pp.

Reexamination Application No. 90/008,011, filed Jul. 24, 2006, 75 pp.

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department, University of California*, Berkeley, 12 pp., 1996.

Johnson, David B., "Routing in Ad Hoc Networks of Mobile Hosts," *IEEE*, pp. 158-163, 1995.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

International Search Report and Written Opinion for Application No. PCT/US09/05008, dated Oct. 22, 2009, 8 pp.

Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).

Nachum Shacham & Janet D. Tornow, Future Directions in Packet Radio Technology, Proc. of the IEEE Infocom 1985 at 93 (Mar. 1985). (TN-IP 0005080-86), 17 pp.

John Jubin & Janet D. Tornow, The DARPA Packet Radio Network Protocols, Proc. of the IEEE, vol. 75, No. 1 at 21 (Jan. 87). (TN-IP 0004930-41).

John Jubin, Current Packet Radio Network Protocols, Proc. of the IEEE Infocom1985 at 86 (Mar. 1985), (TN-IP 0004921-29), 9 pp.

David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.

David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.

Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.

Robert E. Kahn, et al., Advances in Packet Radio Technology, Proc. of the IEEE, vol. 66, No. 11, pp. 1468-1496 (Nov. 1978), (TN-IP 0004942-71).

Clifford A. Lynch & Edwin B. Brownrigg, Packet Radio Networks, Bergamon Press, 259-74 (1987), (TN-IP 0004018-175).

Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.

William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.

Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, Vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, Vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE Infocom '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16$^{th}$ ICDCS, p. 319-326, 1996.

Daniel Cohen, Jonathan B. Postel, and Raphael Rom, *Addressing and Routing in a Local Wireless Network*, IEEE INFOCOM 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-draft-ietf-mobileip-optim-00.txt (last visited Sep. 26, 2009), 32 pp.

Mark G. Lewis and J.J Garcia-Luna-Aceves, *Packet-Switching Applique for Tactical VHF Radios*, 1987 IEEE Milcom Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller-Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382 .

D. Hubner, J. Kassubek, F. Reichert, *A Distributed Multihop Protocol for Mobile Stations To Contact A Stationary Infrastructure*, Third IEE Conference on Telecommunications, Conference Publication No. 331, p. 204-7.

Jens Zander and Robert Forchheimer, *The SOFTNET Project: A Retrospect*, IEEE EURCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Hydro One Networks, Inc., Request for Proposal for Smart Metering Services, 16 pp., Mar. 4, 2005.

Trilliant Networks, "The Trilliant AMI Solution," RFP SCP 07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

Lee, David J. Y., "Ricocheting Bluetooth," 2nd International Conference on Microwave and Millimeter Wave Technology Proceedings, Icmmt 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

Leis, John, "TCP/IP Protocol Family," pp. 1 and 42-43, Apr. 3, 2006.

Supplementary European Search Report for Application No. EP 08 85 1869, dated Dec. 30, 2010, 7 pp.

International Search Report for Application No. PCT/US10/26956, dated May 19, 2010, 2 pp.

Supplementary European Search Report for Application No. EP 08 85 1132, dated Dec. 6, 2010, 9 pp.

Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).

Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).

Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, Ch, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietf.org/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks,"Modeling, Analysis and Simulation of Computer and Telecommunications Systems, $10^{th}$ IEEE Proceedings on Mascots, Oct. 11-16, 2002, Piscataway, NJ (XP010624424) (ISNB: 978-0/7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

\* cited by examiner

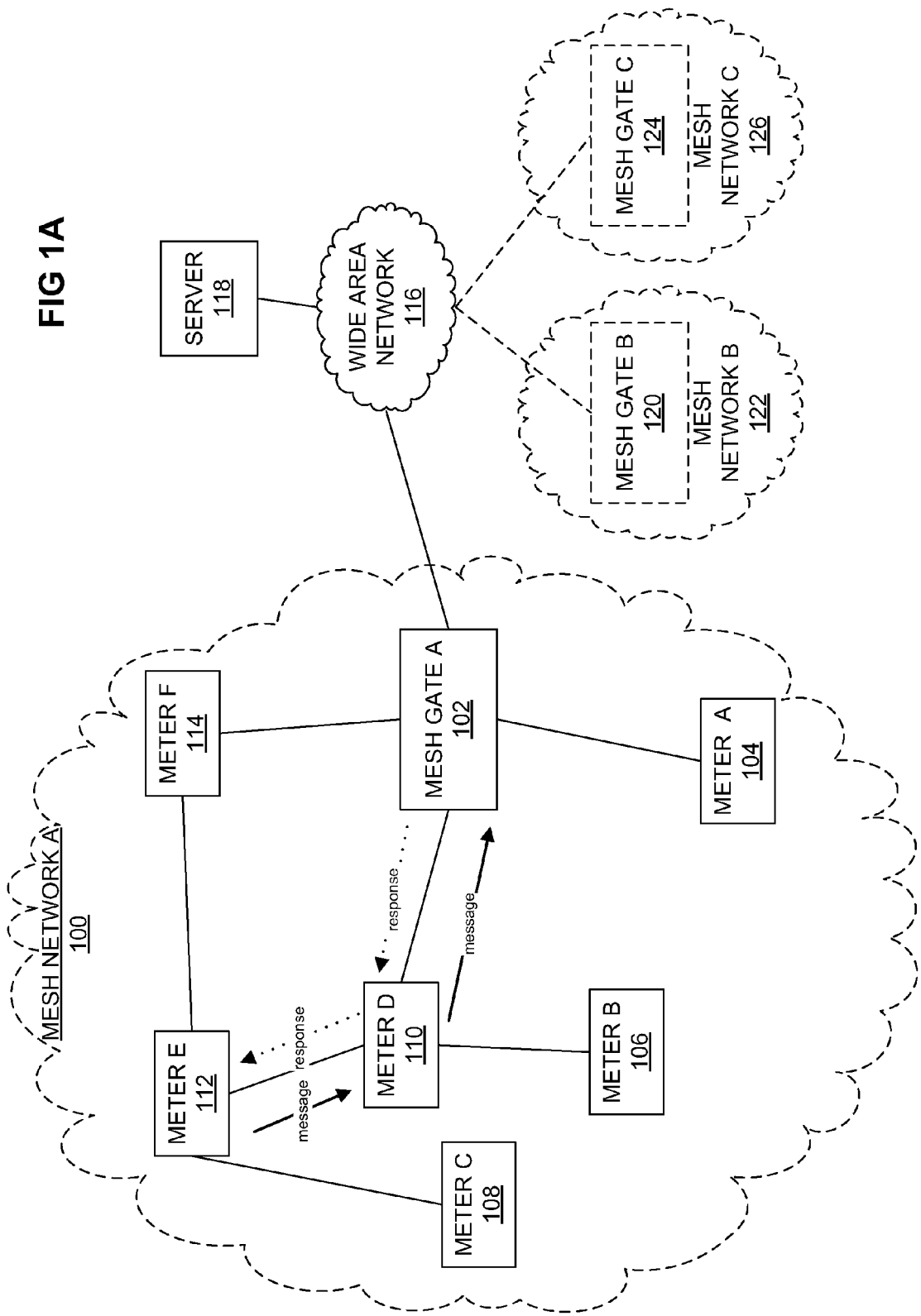

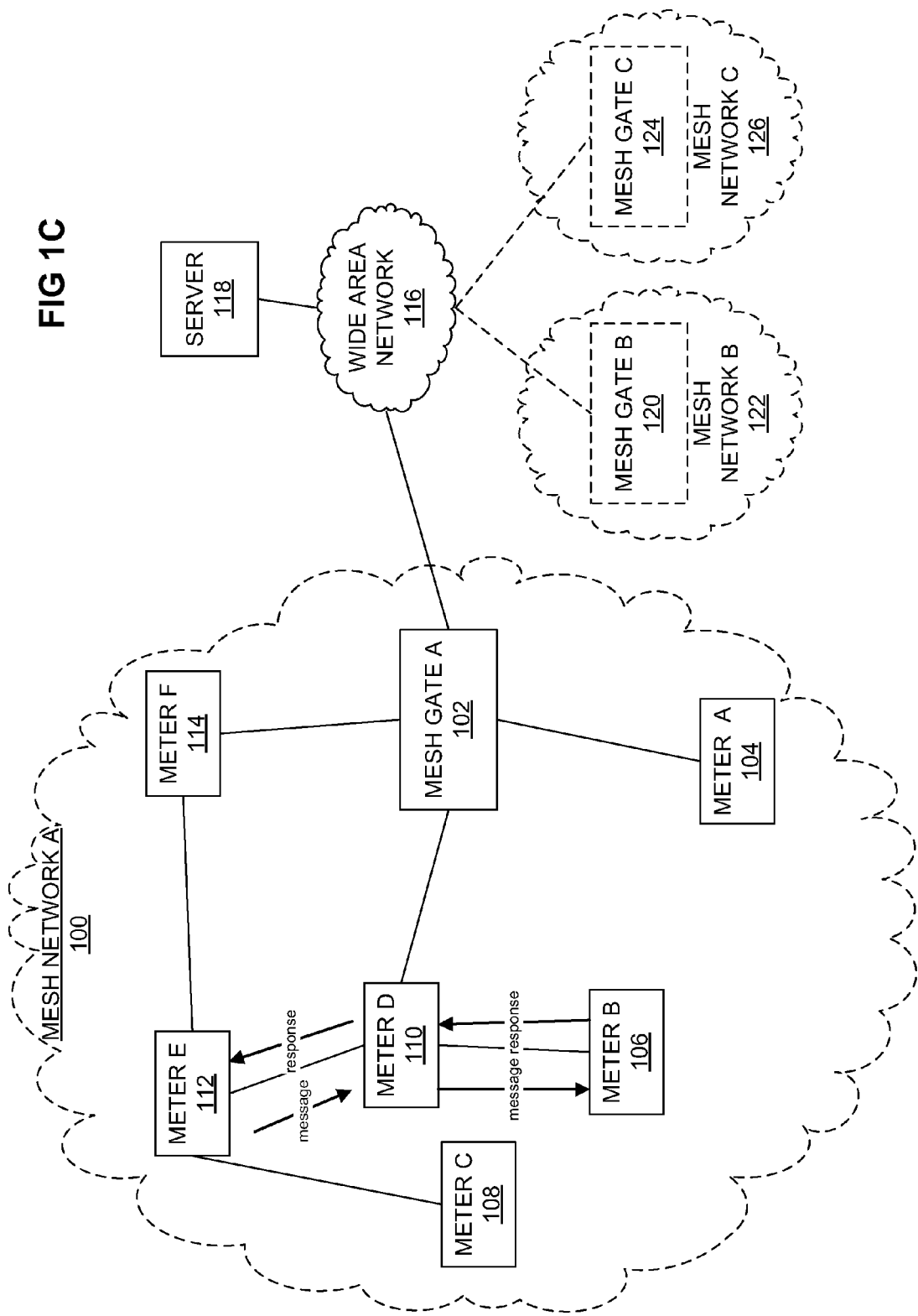

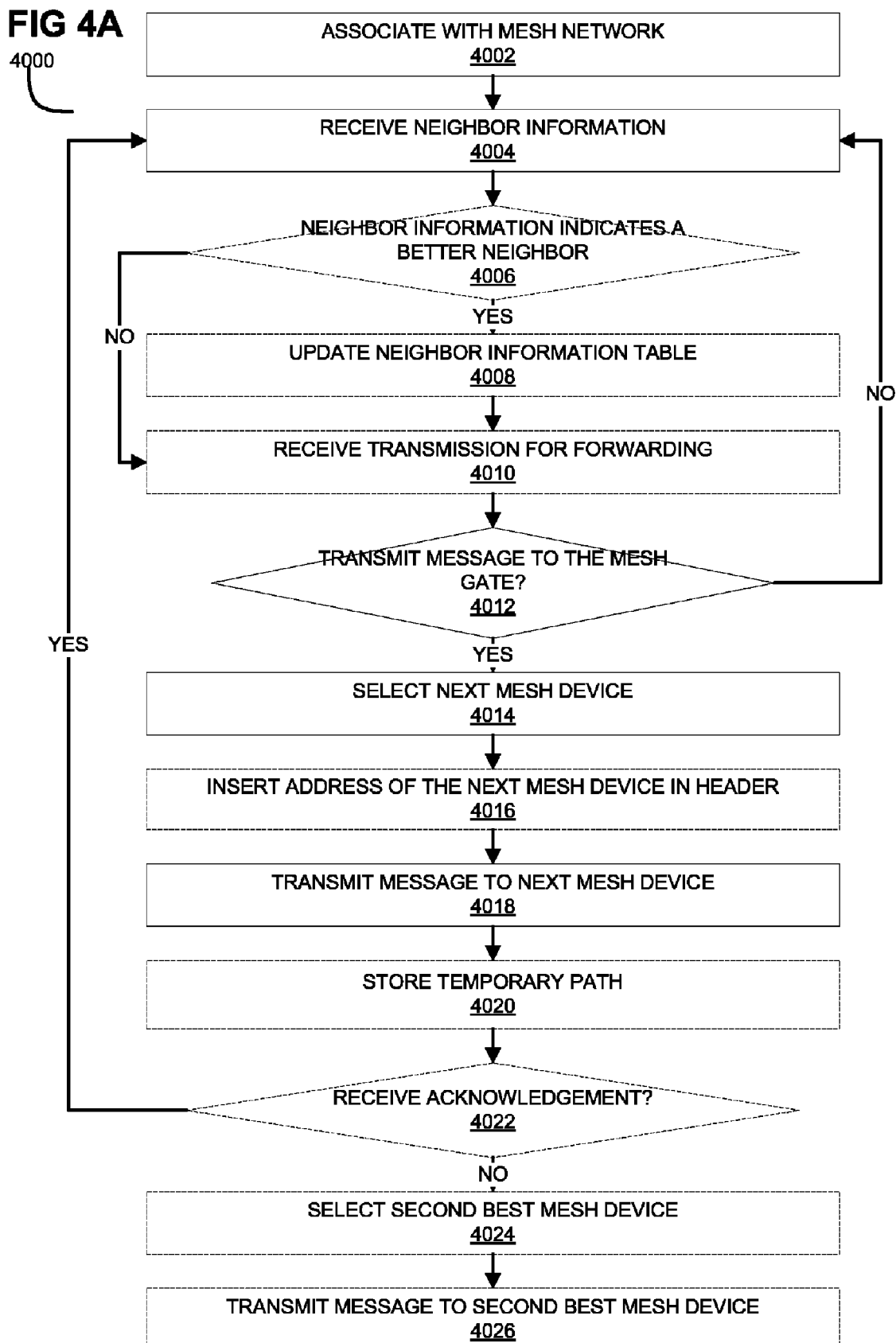

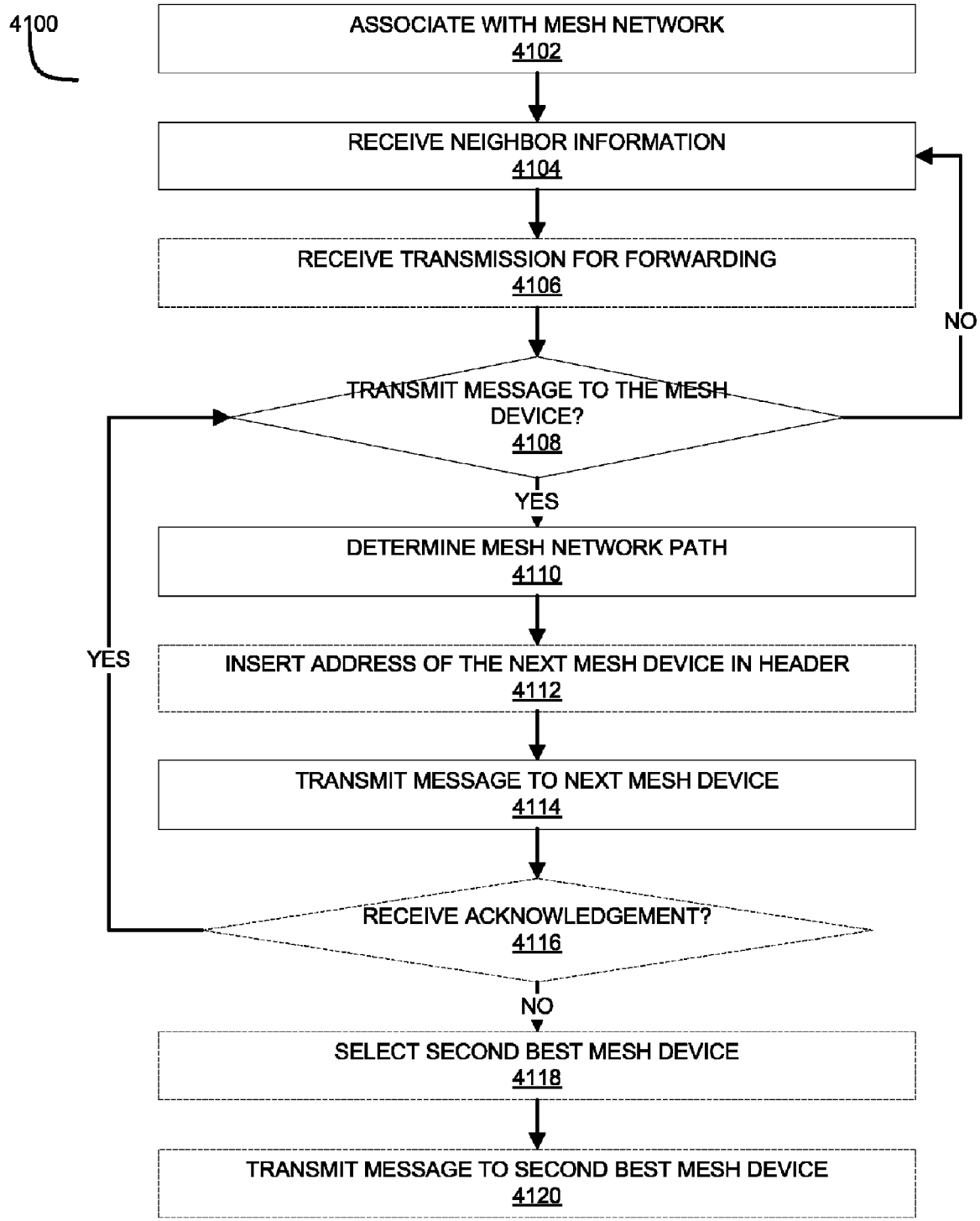

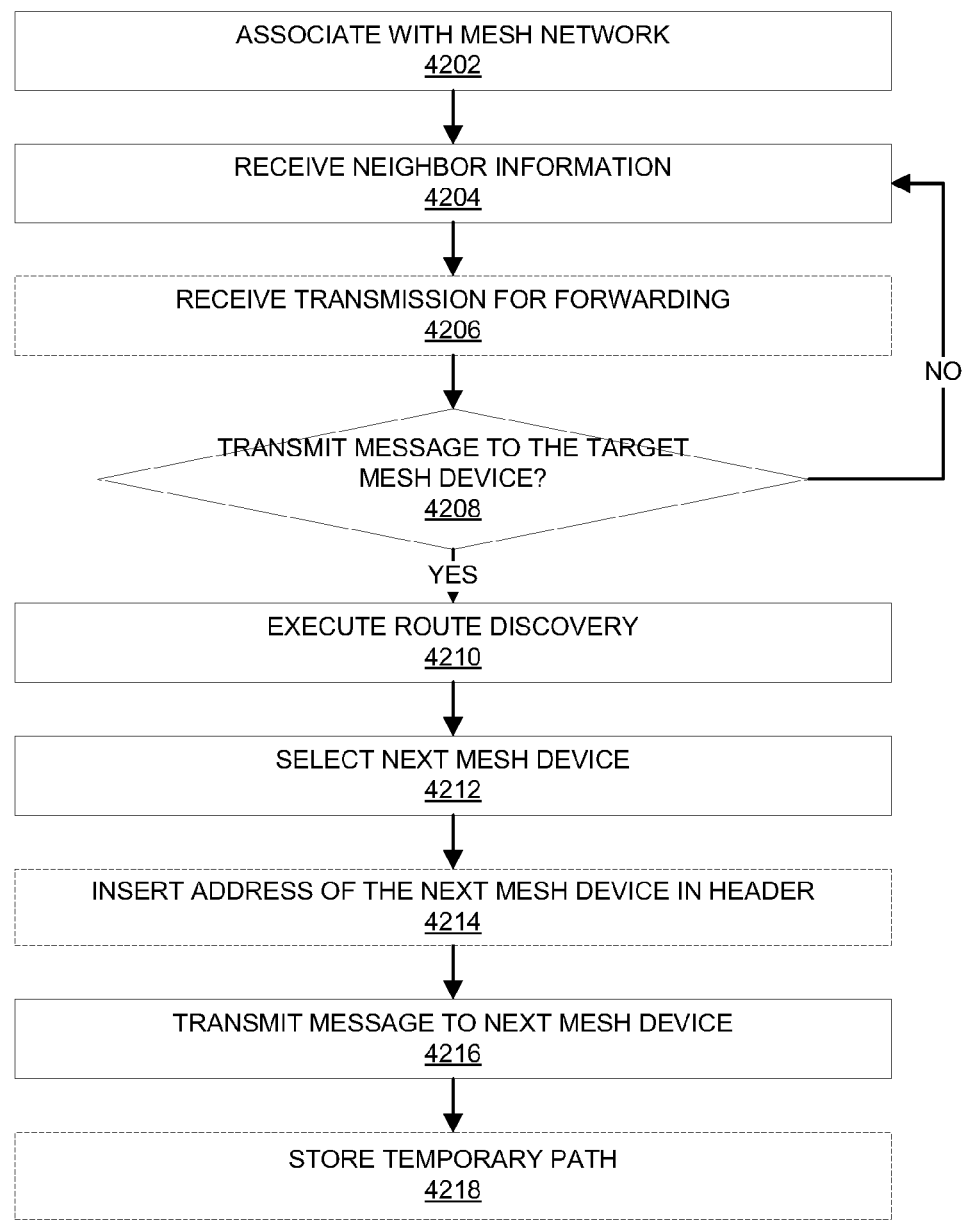

COMMUNICATION AND MESSAGE ROUTE OPTIMIZATION AND MESSAGING IN A MESH NETWORK

CROSS REFERENCE TO RELATED APPLICATIONS

This application claims the benefit of priority to the following U.S. provisional patent applications which are incorporated herein by reference in their entirety:

Ser. No. 60/989,957 entitled "Point-to-Point Communication within a Mesh Network", filed Nov. 25, 2007 (TR0004-PRO);

Ser. No. 60/989,967 entitled "Efficient And Compact Transport Layer And Model For An Advanced Metering Infrastructure (AMI) Network," filed Nov. 25, 2007 (TR0003-PRO);

Ser. No. 60/989,958 entitled "Creating And Managing A Mesh Network Including Network Association," filed Nov. 25, 2007 (TR0005-PRO);

Ser. No. 60/989,964 entitled "Route Optimization Within A Mesh Network," filed Nov. 25, 2007 (TR0007-PRO);

Ser. No. 60/989,950 entitled "Application Layer Device Agnostic Collector Utilizing ANSI C12.22," filed Nov. 25, 2007 (TR0009-PRO);

Ser. No. 60/989,953 entitled "System And Method For Real Time Event Report Generation Between Nodes And Head End Server In A Meter Reading Network Including From Smart And Dumb Meters," filed Nov. 25, 2007 (TR0010-PRO);

Ser. No. 60/989,975 entitled "System and Method for Network (Mesh) Layer And Application Layer Architecture And Processes," filed Nov. 25, 2007 (TR0014-PRO);

Ser. No. 60/989,959 entitled "Tree Routing Within a Mesh Network," filed Nov. 25, 2007 (TR0017-PRO);

Ser. No. 60/989,961 entitled "Source Routing Within a Mesh Network," filed Nov. 25, 2007 (TR0019-PRO);

Ser. No. 60/989,962 entitled "Creating and Managing a Mesh Network," filed Nov. 25, 2007 (TR0020-PRO);

Ser. No. 60/989,951 entitled "Network Node And Collector Architecture For Communicating Data And Method Of Communications," filed Nov. 25, 2007 (TR0021-PRO);

Ser. No. 60/989,955 entitled "System And Method For Recovering From Head End Data Loss And Data Collector Failure In An Automated Meter Reading Infrastructure," filed Nov. 25, 2007 (TR0022-PRO);

Ser. No. 60/989,952 entitled "System And Method For Assigning Checkpoints To A Plurality Of Network Nodes In Communication With A Device Agnostic Data Collector," filed Nov. 25, 2007 (TR0023-PRO);

Ser. No. 60/989,954 entitled "System And Method For Synchronizing Data In An Automated Meter Reading Infrastructure," filed Nov. 25, 2007 (TR0024-PRO);

Ser. No. 60/992,312 entitled "Mesh Network Broadcast," filed Dec. 4, 2007 (TR0027-PRO);

Ser. No. 60/992,313 entitled "Multi Tree Mesh Networks", filed Dec. 4, 2007 (TR0028-PRO);

Ser. No. 60/992,315 entitled "Mesh Routing Within a Mesh Network," filed Dec. 4, 2007 (TR0029-PRO);

Ser. No. 61/025,279 entitled "Point-to-Point Communication within a Mesh Network", filed Jan. 31, 2008 (TR0030-PRO), and which are incorporated by reference.

Ser. No. 61/025,270 entitled "Application Layer Device Agnostic Collector Utilizing Standardized Utility Metering Protocol Such As ANSI C12.22," filed Jan. 31, 2008 (TR0031-PRO);

Ser. No. 61/025,276 entitled "System And Method For Real-Time Event Report Generation Between Nodes And Head End Server In A Meter Reading Network Including Form Smart And Dumb Meters," filed Jan. 31, 2008 (TR0032-PRO);

Ser. No. 61/025,282 entitled "Method And System for Creating And Managing Association And Balancing Of A Mesh Device In A Mesh Network," filed Jan. 31, 2008 (TR0035-PRO);

Ser. No. 61/025,271 entitled "Method And System for Creating And Managing Association And Balancing Of A Mesh Device In A Mesh Network," filed Jan. 31, 2008 (TR0037-PRO);

Ser. No. 61/025,287 entitled "System And Method For Operating Mesh Devices In Multi-Tree Overlapping Mesh Networks", filed Jan. 31, 2008 (TR0038-PRO);

Ser. No. 61/025,278 entitled "System And Method For Recovering From Head End Data Loss And Data Collector Failure In An Automated Meter Reading Infrastructure," filed Jan. 31, 2008 (TR0039-PRO);

Ser. No. 61/025,273 entitled "System And Method For Assigning Checkpoints to A Plurality Of Network Nodes In Communication With A Device-Agnostic Data Collector," filed Jan. 31, 2008 (TR0040-PRO);

Ser. No. 61/025,277 entitled "System And Method For Synchronizing Data In An Automated Meter Reading Infrastructure," filed Jan. 31, 2008 (TR0041-PRO); and Ser. No. 61/094,116 entitled "Message Formats and Processes for Communication Across a Mesh Network," filed Sep. 4, 2008 (TR0049-PRO).

This application hereby references and incorporates by reference each of the following United States patent applications filed contemporaneously herewith:

Ser. No. 12/275,236 entitled "Point-to-Point Communication within a Mesh Network", filed Nov. 21, 2008 (TR0004-US);

Ser. No. 12/275,242 entitled "Efficient And Compact Transport Layer And Model For An Advanced Metering Infrastructure (AMI) Network," filed Nov. 21, 2008 (TR0003-US);

Ser. No. 12/275,242 entitled "COLLECTOR DEVICE AND SYSTEM UTILIZING STANDARDIZED UTILITY METERING PROTOCOL," filed Nov. 21, 2008 (TR0009-US);

Ser. No. 12/275,252 entitled "METHOD AND SYSTEM FOR CREATING AND MANAGING ASSOCIATION AND BALANCING OF A MESH DEVICE IN A MESH NETWORK," filed Nov. 21, 2008 (TR0020-US); and Ser. No. 12/275,257 entitled "System And Method For Operating Mesh Devices In Multi-Tree Overlapping Mesh Networks", filed Nov. 21, 2008 (TR0038-US).

FIELD OF THE INVENTION

This invention pertains generally to methods and systems for routing communications and messages within a mesh network and more particularly to routing algorithms that optimize mesh network resource use.

BACKGROUND OF THE INVENTION

A mesh network is a wireless network configured to route data between mesh device nodes within the network. It allows for continuous connections and reconfigurations around broken or blocked paths by retransmitting messages from node to node until a destination is reached. Mesh networks differ from other networks in that nodes can all connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from advanced devices such as electricity meters, gas meters, and water meters, through a network on request or a pre-defined schedule. This infrastructure includes hardware, software, communications, customer associated systems and mesh device Data management software. The infrastructure collects and distributes information to customers, suppliers, utility companies and service providers. This enables these businesses to either participate in, or provide, demand response solutions, products and services. Customers may alter energy usage patterns from normal consumption patterns in response to demand pricing. This improves system load and reliability.

The mesh gate may interface between the mesh network and a server over a wide area network (WAN). Each mesh device may associate with a mesh network and mesh gate, leaving the mesh network vulnerable to a failure in the mesh gate. In addition, there may be limited paths between mesh devices within the mesh network.

SUMMARY OF THE INVENTION

An access point periodically calculates an optimal path from each associated mesh device to the access point. The access point also transmits the optimal path to each mesh device. A mesh network routes messages and other communications between nodes. Nodes of the mesh network can include a mesh gate and at least one mesh device. Tree routing may be used to determine an optimal route from a mesh device to the mesh gate via the mesh network by using neighbor information at each mesh device on the path. Source routing may be used to determine an optimal path from the mesh gate to a mesh device by using neighbor information of the entire mesh network at the mesh gate. Mesh routing may be used to determine an optimal route from a first mesh device to a second mesh device. Routes may be periodically optimized for a variety of performance factors.

In one aspect, there is provided a system for optimizing communication paths within a mesh network, including: means for initiating a mesh network, the mesh network including at least one mesh device; a receiver receiving registration information from each mesh device of the mesh network; a memory storage for storing mesh device information in an accessible memory; a processor logic, responsive to predetermined trigger, for calculating an optimal path from each mesh device, wherein the optimal path includes a set of mesh device addresses corresponding to a set of mesh devices along which a message can be forwarded; and a transmitter for transmitting the calculated optimal path to each mesh device.

In another aspect, there is provided a computer program stored in a computer readable form for execution within a processor and memory associated memory to execute a method for optimizing communication paths within a mesh network, including: initiating a mesh network, the mesh network including at least one mesh device; receiving registration information from each mesh device of the mesh network; storing mesh device information in an accessible memory; responsive to predetermined trigger, calculating an optimal path from each mesh device, wherein the optimal path includes a set of mesh device addresses corresponding to a set of mesh devices along which a message can be forwarded; and transmitting the calculated optimal path to each mesh device.

In another aspect, there is provided a method for transmitting a message over a mesh network via a routing, the method including: associating a first mesh device with a mesh network, the mesh network managed by an access point; identifying a next mesh device from among a plurality of neighbor mesh devices; and transmitting the message to the identified next mesh device.

In another aspect, there is provided a method for transmitting a message over a mesh network via a routing, the method including: associating a first mesh device with a mesh network, the mesh network managed by an access point; and identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a system for transmitting a message over a mesh network via a routing, the system including: means associating a first mesh device with a mesh network, the mesh network managed by an access point; and means for identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a computer program stored in a computer readable form for execution within a processor and memory associated memory to execute a method for transmitting a message over a mesh network via a routing, the method including: associating a first mesh device with a mesh network, the mesh network managed by an access point; and identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a method for transmitting a message over a mesh network via tree routing, the method including: associating a first mesh device with a mesh network, the mesh network managed by an access point; receiving neighbor information from a set of neighboring mesh devices; responsive to a request to transmit a message to the access point, selecting a next mesh device from the set of neighboring mesh devices, wherein the next mesh device is closer to the access point; and transmitting the message to the next mesh device.

In another aspect, there is provided a system for transmitting a message over a mesh network via tree routing, the system including: an association logic unit for associating a first mesh device with a mesh network, the mesh network managed by an access point; a receiver for receiving neighbor information from a set of neighboring mesh devices; a selection logic unit responsive to a request to transmit a message to the access point, selecting a next mesh device from the set of neighboring mesh devices, wherein the next mesh device is closer to the access point; and a transmitter for transmitting the message to the next mesh device.

In another aspect, there is provided a computer program stored in a computer readable form for execution within a processor and memory associated memory to execute a method for transmitting a message over a mesh network via tree routing, the method including: associating a first mesh device with a mesh network, the mesh network managed by an access point; receiving neighbor information from a set of neighboring mesh devices; responsive to a request to transmit a message to the access point, selecting a next mesh device from the set of neighboring mesh devices, wherein the next mesh device is closer to the access point; and transmitting the message to the next mesh device.

In another aspect, there is provided a system for transmitting a message over a mesh network via tree routing, the system including: means for associating a first mesh device with a mesh network, the mesh network managed by an access point; means for receiving neighbor information from a set of neighboring mesh devices; means responsive to a request for transmitting a message to the access point, selecting a next mesh device from the set of neighboring mesh devices, wherein the next mesh device is closer to the access point; and means for transmitting the message to the next mesh device.

In another aspect, there is provided a method for transmitting a message over a mesh network via source routing, the method including: associating a first mesh device with a mesh network, the mesh network managed by an access point; receiving a next mesh device address from the access point, wherein the next mesh device is part of an optimal path to the access point; and responsive to a request to transmit a message to the access point, transmitting the message to the next mesh device.

In another aspect, there is provided a system for transmitting a message over a mesh network via source routing, the system including: an association logic unit for associating a first mesh device with a mesh network, the mesh network managed by an access point; a receiver for receiving a next mesh device address from the access point, wherein the next mesh device is part of an optimal path to the access point; and a transmitter responsive to a request to transmit a message to the access point, for transmitting the message to the next mesh device.

In another aspect, there is provided a computer program stored in a computer readable form for execution within a processor and memory associated memory to execute a method for transmitting a message over a mesh network via source routing, the method including: associating a first mesh device with a mesh network, the mesh network managed by an access point; receiving a next mesh device address from the access point, wherein the next mesh device is part of an optimal path to the access point; and responsive to a request to transmit a message to the access point, transmitting the message to the next mesh device.

In another aspect, there is provided a system for transmitting a message over a mesh network via source routing, the system including: means for associating a first mesh device with a mesh network, the mesh network managed by an access point; means for receiving a next mesh device address from the access point, wherein the next mesh device is part of an optimal path to the access point; and means responsive to a request to transmit a message to the access point, for transmitting the message to the next mesh device.

In another aspect, there is provided a method for transmitting a message over a mesh network via mesh routing, the method including: associating a first mesh device with a mesh network, the mesh network managed by an access point; responsive to a request to transmit a message to a receiving mesh device, broadcasting an optimal path query to neighboring mesh devices; receiving replies from the neighboring mesh devices; calculating an optimal path, the optimal path including an address of a next mesh device; and transmitting the message to the next mesh device.

In another aspect, there is provided a system for transmitting a message over a mesh network via mesh routing, the system including: an association logic unit for associating a first mesh device with a mesh network, the mesh network managed by an access point; a transmitter responsive to a request to transmit a message to a receiving mesh device, for broadcasting an optimal path query to neighboring mesh devices; a receiver for receiving replies from the neighboring mesh devices; a processing logic for calculating an optimal path, the optimal path including an address of a next mesh device; the transmitter being adapted for transmitting the message to the next mesh device.

In another aspect, there is provided a computer program stored in a computer readable form for execution within a processor and memory associated memory to execute a method for transmitting a message over a mesh network via mesh routing, the method including: associating a first mesh device with a mesh network, the mesh network managed by an access point; responsive to a request to transmit a message to a receiving mesh device, broadcasting an optimal path query to neighboring mesh devices; receiving replies from the neighboring mesh devices; calculating an optimal path, the optimal path including an address of a next mesh device; and transmitting the message to the next mesh device.

In another aspect, there is provided a method for route discovery within a mesh network via mesh routing, the method including: associating a first mesh device with a mesh network, the mesh network managed by an access point; responsive to receiving an optimal path query from a sending mesh device, re-broadcasting the optimal path query to neighboring mesh devices; responsive to receiving an optimal path reply, calculating an optimal path; and replying to the sending mesh device with the optimal path.

In another aspect, there is provided a system for route discovery within a mesh network via mesh routing, the system comprising: means associated with a mesh network, the mesh network managed by an access point; means responsive to receiving an optimal path query from a sending mesh device, for re-broadcasting the optimal path query to neighboring mesh devices; means responsive to receiving an optimal path reply, for calculating an optimal path; and means for replying to the sending mesh device with the optimal path.

In another aspect, there is provided a computer program stored in a computer readable form for execution within a processor and memory associated memory to execute a method for route discovery within a mesh network via mesh routing, the method including: associating a first mesh device with a mesh network, the mesh network managed by an access point; responsive to receiving an optimal path query from a sending mesh device, re-broadcasting the optimal path query to neighboring mesh devices; responsive to receiving an optimal path reply, calculating an optimal path; and replying to the sending mesh device with the optimal path.

Other aspects and features will be apparent from the included description, drawings, and accompanying claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1A illustrates an example system for providing communications in an AMI system utilizing a tree routing scheme.

FIG. 1C illustrates an example system for providing communications in an AMI system utilizing a mesh routing scheme.

FIG. 4A illustrates an example procedure for tree routing and route optimization in a mesh network.

FIG. 4B illustrates an example procedure for source routing in a mesh network.

FIG. 4C illustrates an example procedure for mesh routing scheme in a mesh network.

DETAILED DESCRIPTION OF THE INVENTION

Figure 1B:
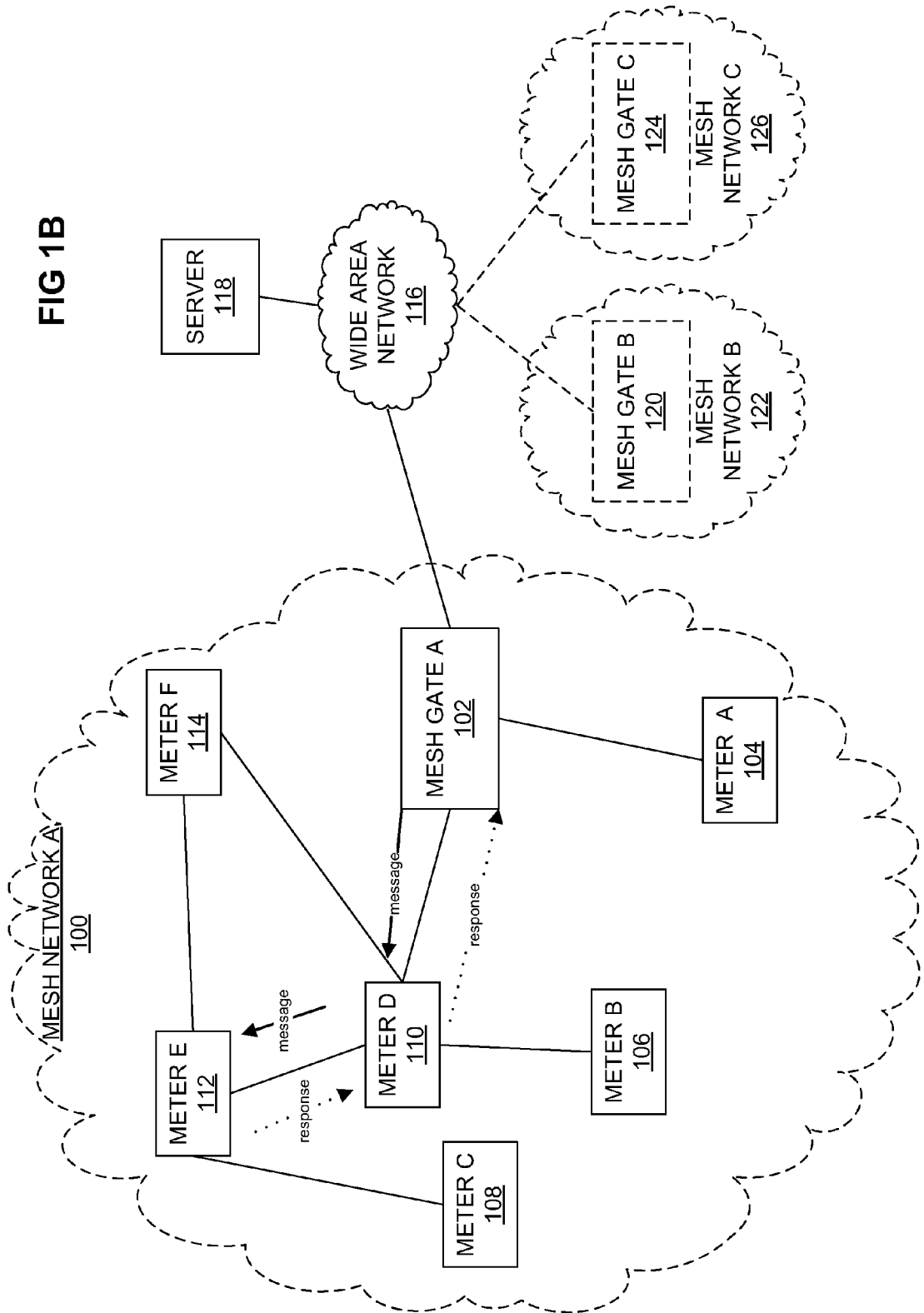
FIG. 1B illustrates an example system for providing communications in an AMI system utilizing a source routing scheme.

FIG. 1A illustrates an example system for providing communications in an AMI system utilizing a tree routing scheme. A mesh device wishing to send a message to the mesh gate may look up a neighbor information table and select a neighbor closer to the mesh gate. A mesh gate may also be referred to as a NAN-WAN (Neighborhood Area Network-Wide Area Network) gate or an access point. Other fields stored in the neighbor information table may include a path signal quality. The message may be transmitted to the neighbor for forwarding to the mesh gate. The neighbor information table may be updated via periodic neighbor information exchanges with neighboring mesh devices.

When the forwarding mesh device receives the message, it also looks up a neighbor information table and selects a mesh device closer to the mesh gate. In this way, the message is transmitted from one mesh device to another, until it reaches the mesh gate. A temporary path may be created at each forwarding mesh device. The temporary path may allow a response to be transmitted back to the sending mesh device, if required. Temporary paths may be stored in a memory of forwarding mesh devices for a predetermined interval.

In the example of FIG. 1A, the mesh network A 100 may include a plurality of mesh gates and mesh devices, such as meters, which together cover a geographical area. In a non-limiting embodiment for an urban or metropolitan geographical area, there may be between 1 and 100 mesh gates, but this is not a limitation of the invention. In one embodiment, each mesh gate supports approximately 400 meters, depending on system requirements, wireless reception conditions, available bandwidth, and other considerations. It will be appreciated that it is preferable to limit meter usage of bandwidth to allow for future upgrades. The meters may include utilities sensors and be part of an AMI system and communicate with the mesh gates over the mesh network. For example, the AMI system may monitor utilities usage, such as gas, water, or electricity. Alternative mesh devices include thermostats, user displays, and other components for monitoring and controlling utilities.

In the example of FIG. 1A, the mesh gate A 102 may provide a gateway between the mesh network and a server. The mesh gate A 102 may include a mesh radio to communicate with mesh devices on the mesh network and a WAN communication interface to communicate with a server over the WAN.

In the example of FIG. 1A, the mesh gate A 102 may aggregate information from meters within the mesh network and transmit the information to the server. The mesh gate A may also forward individual communications from a mesh device to the server. While only one mesh gate is depicted in the mesh network A, any number of mesh gates may be deployed, for example, to improve transmission bandwidth to the server and provide redundancy in the mesh network.

The mesh gate may also be known as a collector, a concentrator, or an access point.

In the example of FIG. 1A, the meters A 104, B 106, C 108, D 110, E 112, and F 114 may each be a mesh device associated with the mesh network A through direct or indirect communications with the mesh gate A. Each meter may forward transmissions from other meters within the mesh network towards the mesh gate. While only six meters are depicted, any number of meters may be deployed to cover any number of utility lines or locations within the mesh network.

In the example of FIG. 1A, as depicted, only meters A 104 and D 110 are in direct communications with mesh gate A 102. However, meters B 106, E 112 and F 114 can all reach mesh gate A 102 through mesh device D 110. Similarly, meter C 108 can reach mesh gate A 102 through mesh device E 112 and mesh device D 110.

In the example of FIG. A, the WAN 116 may be a communication medium capable of transmitting digital information. For example, the WAN 116 may be the Internet, a cellular network, a private network, a phone line configured to carry a dial-up connection, an Ethernet network, or any other network.

In the example of FIG. 1A, the server 118 may be a computing device configured to receive information, such as meter readings, from a plurality of mesh networks and meters. The server 118 may also be configured to transmit instructions and queries to the mesh networks, mesh gates, and meters.

In one example embodiment, the server 118 is known as a "head end server" or "head end."

It will be appreciated that a mesh device association can include a registration for application service at the mesh gate A 102 or the server 118. The mesh gate A102 and the server 118 can maintain a table of available applications and services and requesting mesh devices.

In an alternative, any number of servers may be deployed in the AMI system. For example, servers may be distributed by geographical location for shorter communication distances and latency times. Redundant servers may provide backup and failover capabilities in the AMI system.

In the example of FIG. 1A, the optional mesh gates B 120 and C 124 may be similar to mesh gate A 102, discussed above. Each mesh gate may be associated with a mesh network, similar to the mesh network A 102. For example, mesh gate B 120 may be associated with mesh network B 122 and mesh gate C 124 may be associated with mesh network C 126. Each mesh network may include a plurality of meters (not depicted).

In the example of FIG. 1A, each mesh network may include meters covering a geographical area, such as a premise, a residential building, an apartment building, or a residential block. Alternatively, the mesh network may include a utilities network and be configured to measure utilities flow at each sensor. Each mesh gate communicates with the server over the WAN, and thus the server may receive information from and control a large number of meters or mesh devices. Mesh devices may be located wherever they are needed, without the necessity of providing wired communications with the server.

In the example of FIG. 1A, in operation, an AMI system may facilitate communications between the system components. Mesh device E 112 may need to transmit a message to the mesh gate A and utilize a tree routing scheme. For example, the mesh device E may look up its neighbor information table and realize mesh device D is one hop from the mesh gate A. Because mesh device E is two hops from the mesh gate A, it may select mesh device D and transmit a message for forwarding to mesh device D. Mesh device D may receive the message, determine it is addressed to the mesh gate A, and forward the message. Mesh device D may also store mesh device E as the next hop on the temporary route.

In the example of FIG. 1A, after mesh gate A receives the message, an optional response may be sent. Mesh gate A may transmit the response to mesh device D, which checks its temporary route table and retrieves mesh device E as the next hop for the message. Thus, mesh device E may receive a response from the mesh gate, if one is required.

FIG. 1B illustrates an example system for providing communications in an AMI system utilizing a source routing scheme. The mesh network A may be as discussed above, including a plurality of mesh devices and at least one mesh gate.

In the example of FIG. 1B, in operation, an AMI system may facilitate communications between the system components. The mesh gate A may need to transmit a message to the mesh device E and utilize a source routing scheme. Each mesh device may maintain a neighbor information table which stores information on neighboring mesh devices. Each mesh device may periodically transmit its neighbor information table to the mesh gate A.

In the example of FIG. 1B, with the neighbor information tables of all mesh devices in the mesh network, the mesh gate may determine an optimal path to a target mesh device. The mesh gate A looks up the neighbor information table of the target mesh device and determines an optimal next hop towards the mesh gate. The mesh gate A looks up the neighbor information table of the next hop mesh device, and determines an optimal next hop. In this way, the mesh gate A may backtrack an optimal path from the target mesh device to the mesh gate A, reverse it, and arrive at the optimal path to the target mesh device. Because the mesh gate is equipped with more computing resources and memory as compared to the mesh devices, the above calculations will not put an undue burden on mesh gate functions.

In the example of FIG. 1B, source routing may be used when sending information to mesh devices, such as clock synchronization commands or other instructions. The mesh gate may further maintain a device registrar, including a status associated with each mesh device in the mesh network. For example, a meter status may be: alive, powered down, or not responding. Meters that are not responding may be removed from the device registrar after a predetermined period.

In the example of FIG. 1B, a temporary path is not required, because each mesh device already stores an optimal next hop towards the mesh gate. Any response that needs to be sent will be forwarded using the above discussed tree routing scheme.

FIG. 1C illustrates an example system for providing communications in an AMI system utilizing a mesh routing scheme. The mesh network A may be as discussed above, including a plurality of mesh devices and at least one mesh gate.

In the example of FIG. 1C, in operation, an AMI system may facilitate communications between the system components. A source mesh device may need to transmit a message to a target mesh device. Each mesh device may maintain a temporary path table, storing information on a next hop in a mesh route. The mesh route may be determined through a mesh device-initiated route discovery routine.

In the example of FIG. 1C, mesh routing may be used when a meter needs to communicate with another meter, and avoids burdening the mesh gate with forwarding functions. When a source mesh device transmits a message, the message is forwarded by intermediate mesh devices in accordance with an entry in the temporary path tables. The temporary route may include a return path, allowing bilateral communications.

In the example of FIG. 1C, a thermostat may transmit a current temperature setting to other thermostats in a residence, maintaining a universal temperature setting for the residence. In an alternative, a power usage sensor may transmit real-time electricity usage information to a display unit. The display unit may be configured to display electricity usage information to a user and provide audible or other alerts.

In the example of FIG. 1C, the temporary path table may include a destination mesh device, a number of hops to the destination meter, and a next hop. When the mesh device receives a message with a destination address, it determines the appropriate next hop by looking up the temporary path table. Entries in the temporary path table may be periodically cleared if not used.

In the example of FIG. 1C, the temporary path table may be populated through a route discovery request transmitted from the source mesh device. The route discovery request is re-broadcasted by each mesh device until a path to the target mesh device is found.

In an alternative, the temporary path table may be populated by the mesh gate. The mesh gate may determine an optimal mesh routing path and transmit a temporary path table entry to each mesh device along the path.

In the example of FIG. 1C, mesh device E may desire to transmit a message to mesh device B. The message may be received at mesh device D for forwarding. Mesh device D may parse the message to determine the addressee is mesh device B. Mesh device D then looks up its path table previously populated from a neighbor exchange, to determine the path to mesh device B.

In the example of FIG. 1C, mesh device D sees that mesh device B 106 is one hop away from the table entry. Therefore, Mesh device D forwards the messages to mesh device B. Mesh device D also creates a temporary route entry, noting the return path for any possible responses from mesh device B to mesh device E.

Figure 1D:
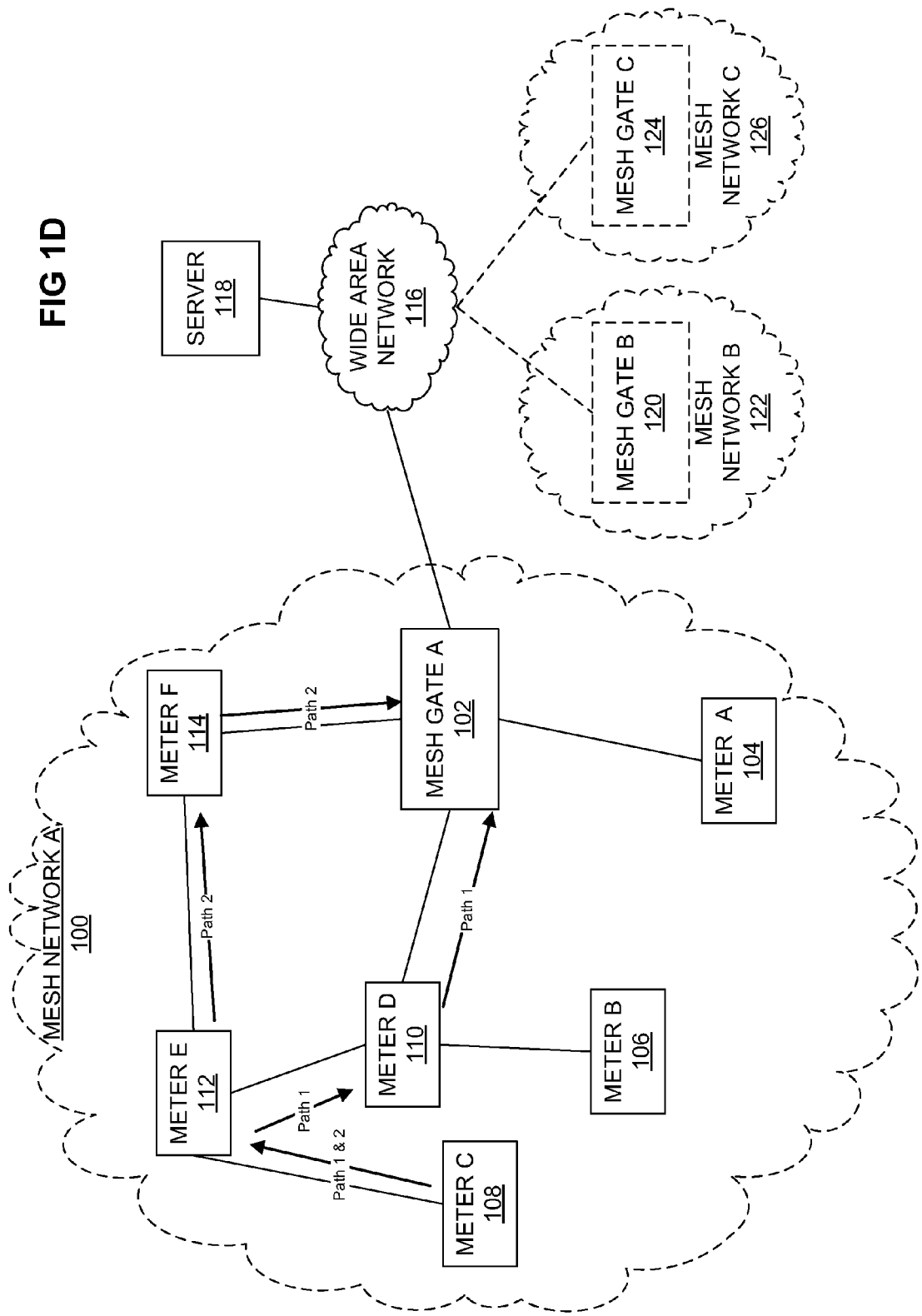
FIG. 1D illustrates an example system for optimizing routes within a mesh network.

FIG. 1D illustrates an example system for optimizing routes within a mesh network. The mesh network A may be as discussed above, including a plurality of mesh devices and at least one mesh gate.

In the example of FIG. 1D, in operation, an AMI system may facilitate communications between the system components. The mesh device C 108 may need to transmit a message to the mesh gate A 102. If there are multiple paths available, the mesh gate will need to select the optimal path. For example, a best path between the mesh device and the mesh gate may be selected based on a number of hops and a path signal quality. Mesh devices may periodically exchange neighbor information in a neighbor exchange. A more detailed discussion of the exchange neighbor information is found in U.S. patent applications Ser. No. 12/275,252 (TR0020) filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference.

In the example of FIG. 1D, an optimal path selection routine may be executed by mesh devices at periodic intervals, for example, once every 24 hours. Changing the optimal path may be limited to provide enough time for mesh devices within the mesh network to update neighborhood tables responsive to the neighbor information exchanges. In addition, each mesh device may need time to transmit newly received neighbor information.

In the example of FIG. 1D, the path signal quality may be measured as a link quality index (LQI). A route may be selected if it has an acceptable LQI. An LQI may have a value of: 3 for Excellent, 2 for Good, 1 for Poor, 0 for No connectivity. A quality of a path may be equal to the worst LQI of the links that comprise the path. For example, the LQI may be used only for route selection but not optimization, to prevent excessive instability in the route tree.

In the example of FIG. 1D, a prospective route may be selected to replace an existing route if it has a better link quality, a lesser number of hops, or any other quality or quantitative measure. When the prospective route is selected, it will be used for future communications.

In the example of FIG. 1D, mesh device C may have two paths to mesh gate A: mesh device E->mesh device D->mesh gate A or mesh device E->meter F->mesh gate A. One of the two paths may be selected based on link quality, number of hops, or any combination of factors.

In the example of FIG. 1D, the path may be selected based on a weighted value of the best route information. For each prospective path, a path value may be calculated. For example, 30% of the calculation may be based on the number of hops in the path, 30% based on the minimum LQI along the path, and 40% on the sum LQI of the path. The path with the highest percentage is selected as the optimal route.

In an alternative, the weighting may be dynamically modified to suit the circumstances. For example, if the system detects high traffic congestion, the path value may include a larger weight on the number of hops. In a high traffic network, it may be desirable to reduce the number of hops if possible, even at the expense of lower signal quality.

In an alternative, if the system detects high radio noise, the path value may include a larger weight on signal quality. In a high noise environment, it may be desirable to seek out a path with the best signal to reduce retransmissions.

It will be appreciated that the mesh gate A 102 can maintain a tree structure of optimal paths to each node within the mesh network. This tree can be updated over time as nodes are added and removed from the mesh network and signal quality/strength change. In this way, an optimal path to each node is always available and updated.

It will be appreciated that a mesh device association can include a registration for application service at the mesh gate A 102 or the server 118. The mesh gate A 102 and the server 118 can maintain a table of available applications and services and requesting mesh devices.

Figure 2B:
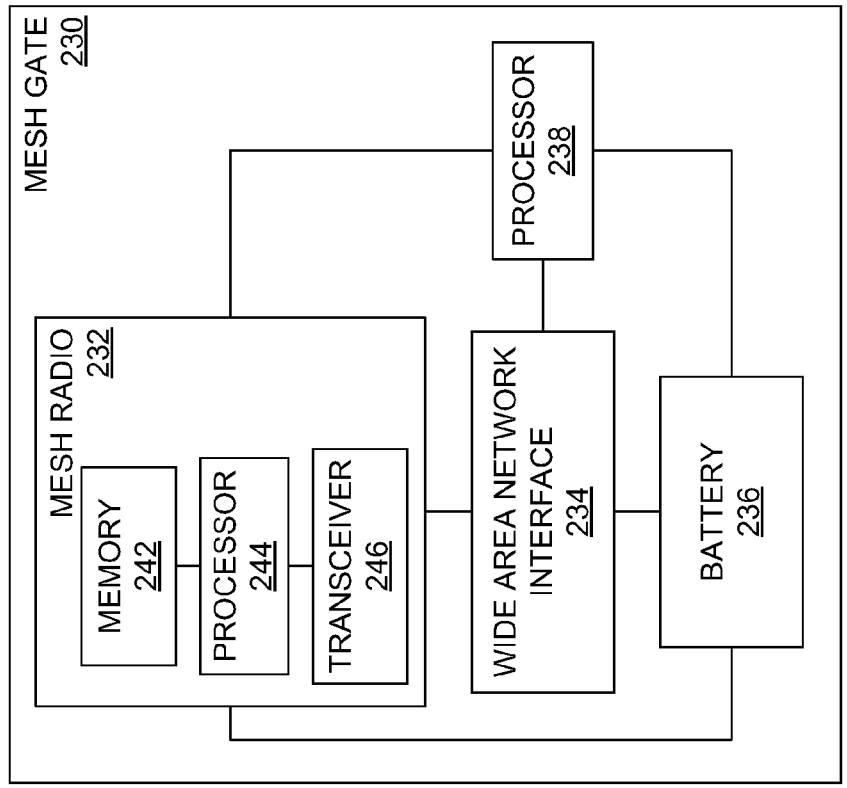
FIG. 2B illustrates an example mesh gate for use within a mesh network.
Figure 2A:
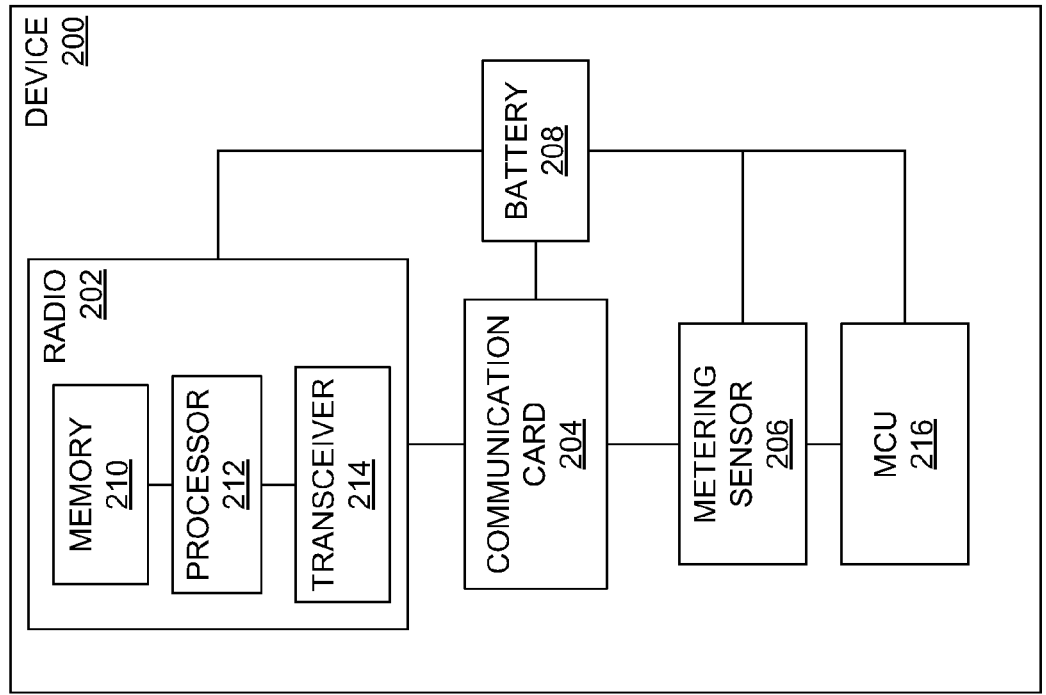
FIG. 2A illustrates an example mesh device for use within a mesh network.

FIG. 2A illustrates an example mesh device, e.g., meter, for use within a mesh network. A mesh device 200 may include a radio 202, a communication card 204, a metering sensor 206, and a battery or other power or energy storage device or source 208. The radio 202 may include a memory 210, a processor 212, a transceiver 214, and a microcontroller unit (MCU) 216.

A mesh device can be any device configured to participate as a node within a mesh network. An example mesh device is a mesh repeater, which can be a wired device configured to retransmit received mesh transmissions. This extends a range of a mesh network and provides mesh network functionality to mesh devices that enter sleep cycles.

In the example of FIG. 2A, the mesh device 200 may communicate with a mesh gate and other mesh devices over a mesh network. For example, the mesh device 200 may be a gas, water or electricity meter installed in a residential building or other location to monitor utilities usage. The mesh device 200 may also control access to utilities on server instructions, for example, by reducing or stopping the flow of gas, water or electricity. In an alternative, the mesh device 200 may be a mobile asset that needs to be tracked by the AMI system.

In the example of FIG. 2A, the radio 202 may be a mesh radio configured to communicate with a mesh network. The radio 202 may transmit, receive, and forward messages to the mesh network. Any meter within the mesh network may thus communicate with any other meter or mesh gate by communicating with its neighbor and requesting a message be forwarded. The radio 202 may also communicate with an off-network device not associated with the mesh network.

In the example of FIG. 2A, the communication card 204 may interface between the radio and the sensor. Sensor readings or other data may be converted to radio signals for transmission over the radio. The communication card 204 may include encryption/decryption functionality or other security measures to protect the transmitted data. The communication card 204 may also decode instructions received from the server.

In the example of FIG. 2A, the optional metering sensor 206 may be a gas, water, or electricity meter sensor, or another sensor. For example, digital flow sensors may be used to measure a quantity of water or gas flowing into a residence or building. Alternatively, the sensor 206 may be an electricity meter configured to measure a quantity of electricity flowing over a power line.

In an alternative, the optional metering sensor may be replaced by another component for performing functions within the AMI system. For example, the mesh device may provide a user interface, such as a thermostat or other utilities control. In this example, the metering sensor may be replaced with a thermostat interface. For example, the mesh device may provide a display screen. In this example, the metering sensor may be replaced with a LCD display screen displaying information for the user. For example, the mesh device may be a simple repeater for extending the range of the mesh network. In this example, the mesh device may simply receive and re-transmit mesh transmissions on the mesh network.

In the example of FIG. 2A, the battery 208 may be configured to independently power the mesh device during a power outage. For example, the battery 208 may be a large capacitor storing electricity to power the meter for at least five minutes after a power outage. Small compact but high capacity capacitors known as super capacitors are known in the art and may advantageously be used. One exemplary super capacitor is the SESSCAP 50f 2.7v 18×30 mm capacitor. Alternative battery technologies may be used, for example, galvanic cells, electrolytic cells, fuel cells, flow cells, and voltaic cells. Alternative battery technologies may be used, for example, galvanic cells, electrolytic cells, fuel cells, flow cells, and voltaic cells.

In the example of FIG. 2A, the memory 210 may store instructions and run-time variables for execution. For example, the memory 210 may include both volatile and non-volatile memory. The memory 210 may also store a history of sensor readings from the metering sensor 206 and an incoming queue of server instructions.

In the example of FIG. 2A, the mesh device may also include a memory in additional to 210. A neighbor table may be stored in memory accessible by the mesh device. For example, the neighbor table may store a best parent field, a best five parents field, a mesh gate load field, a number of hops to the mesh gate field, and a mesh gate path signal quality field. The neighbor table information may be transmitted to other mesh devices in a neighbor exchange and also transmitted to a mesh gate. The neighbor table may be used to determine a best route on the mesh network for a message to be transmitted.

In the example of FIG. 2A, the processor 212 may execute instructions, for example, stored in the memory. Instructions stored in memory 210 may be ordinary instructions, for example, provided at time of meter installation, or special instructions received from the server during run time.

In the example of FIG. 2A, the transceiver 214 may transmit and receive wireless signals to a mesh network. The transceiver 214 may be configured to transmit sensor readings and status updates under control of the processor. The transceiver 214 may receive server instructions from a server, which are communicated to the memory and the processor.

In the example of FIG. 2A, the MCU 216 can execute firmware or software required by the meter 200. The firmware or software can be installed at manufacture or via a mesh network over the radio 202.

In one embodiment, any number of MCUs can exist in the meter 200. For example, two MCUs can be installed, a first MCU for executing firmware handling communication protocols, and a second MCU for handling applications.

In the example of FIG. 2A, each component may be modular and configured for easy removal and replacement. This facilitates component upgrading over a lifetime of the meter as new functionality are developed and deployed in the AMI system.

In the example of FIG. 2A, meters may be located in geographically dispersed locations within an AMI system. For example, a meter may be located near a gas line, an electric line, or a water line entering a building or premise to monitor a quantity of gas, electricity, or water flowing through the line. The meter may communicate with other meters and mesh gates through a mesh network. The meter may transmit meter readings and receive instructions via the mesh network.

In the example of FIG. 2A, in operation, the mesh device 200 may communicate over a mesh network and directly with an off-network device via the radio 202. The communication card 204 may interface between the metering sensor 206 and the radio 202. For example, sensor readings may be transmitted to and instructions received from a server. In addition, the mesh device may participate in the mesh network by forwarding any messages that require forwarding to a next mesh device on a dynamically determined or pre-determined path.

In an alternative, mesh devices may be similar to meters except the metering sensor is replaced by whatever component is necessary to perform the mesh device's function. For example, a user display may include an output screen. For example, a thermostat may include a dial for receiving user input and an analog/digital converter to produce an input signal.

It will be appreciated that a mesh device and a mesh gate can share the architecture of meter 200. The radio 202 and the MCU 216 provide the hardware necessary, and the MCU 216 executes any necessary firmware or software.

FIG. 2B illustrates an example mesh gate for use within a mesh network. The mesh gate 230 may include a mesh radio 232, a wide area network interface 234, a battery 236, and a processor 238. The mesh radio 232 may include a memory 242, a processor 244, and a transceiver 246. The mesh gate 230 may also include a WAN interface 234, a battery 236 and a processor 238. The mesh gate 230 may interface between mesh devices such as meters over a mesh network and a server over a WAN. The mesh gate 230 may be installed in a central location relative to the meters and also communicate with a server over a WAN.

In the example of FIG. 2B, the mesh radio 232 may be a mesh radio configured to communicate with meters over a mesh network. The radio 232 may transmit, receive, and forward messages to the mesh network.

In the example of FIG. 2B, the WAN interface 234 may communicate with a server over a WAN. For example, the WAN may be a cellular network, a private network, a dial up connection, or any other network. The WAN interface 234 may include encryption/decryption functionality or other security measures to protect data being transmitted to and from the server.

In the example of FIG. 2B, the battery 236 may be configured to independently power the mesh gate 230 during a power outage. For example, the battery 236 may be a large capacitor storing electricity to power the mesh gate 230 for at least five minutes after a power outage.

In the example of FIG. 2B, the processor 238 may control the mesh radio 232 and the WAN interface 234. Meter information received from the meters over the mesh radio 232 may be compiled into composite messages for transmission to the server. Server instructions may be received from the WAN interface 234 and transmitted to meters in the mesh network for execution. Server instructions may also be received from the WAN interface 234 for execution by the processor 238.

In the example of FIG. 2B, an accessible memory may store neighbor information for all mesh devices within the mesh network and associated with the mesh device. For example, neighbor information for each mesh device may include a best parent field, a best five parents field, a mesh gate load field, a number of hops to the mesh gate field, and a mesh gate path signal quality field. The neighbor table information may be exchanged between mesh devices and also transmitted to the mesh gate. The mesh gate may be configured to calculating various routing based on the compiled neighbor table.

In the example of FIG. 2B, the mesh radio 232, WAN interface 234, battery 236, and processor 238 may be modular and configured for easy removal and replacement. This facilitates component upgrading over a lifetime of the mesh gate 230.

In the example of FIG. 2B, the memory 242 of the mesh radio 232 may store instructions and run-time variables of the mesh radio 232. For example, the memory 242 may include both volatile and non-volatile memory. The memory 242 may also store a history of meter communications and a queue of incoming server instructions. For example, meter communications may include past sensor readings and status updates.

In the example of FIG. 2B, the mesh gate may include an additional memory configured to store values in the execution of mesh gate functions. For example, a history of meter readings, status updates may be stored for future retrieval. In addition, a neighbor table of the mesh table associated with the mesh gate may be stored. The neighbor table may be used to determine a best path through the mesh network for messages.

In the example of FIG. 2B, the processor 244 of the mesh radio 232 may execute instructions, for example, stored in memory 242. Instructions stored in memory 242 may be ordinary instructions, for example, provided at time of mesh gate installation, or special instructions received from the server during run-time.

In the example of FIG. 2B, the transceiver 246 of the mesh radio 232 may transmit and receive wireless signals to a mesh network. The transceiver 246 may be configured to receive sensor readings and status updates from a plurality of meters in the mesh network. The transceiver 246 may also receive server instructions, which are communicated to the memory 242 and the processor 244.

In the example of FIG. 2B, in operation, the mesh gate may interface between a mesh network and a server. The mesh gate may communicate with meters in the mesh network and communicate with the server over a WAN network. By acting as a gateway, the mesh gate forwards information and instructions between the meters in its mesh network and the server. The mesh gate may also function as a node within the mesh network, by forwarding messages between mesh devices.

Figure 3:
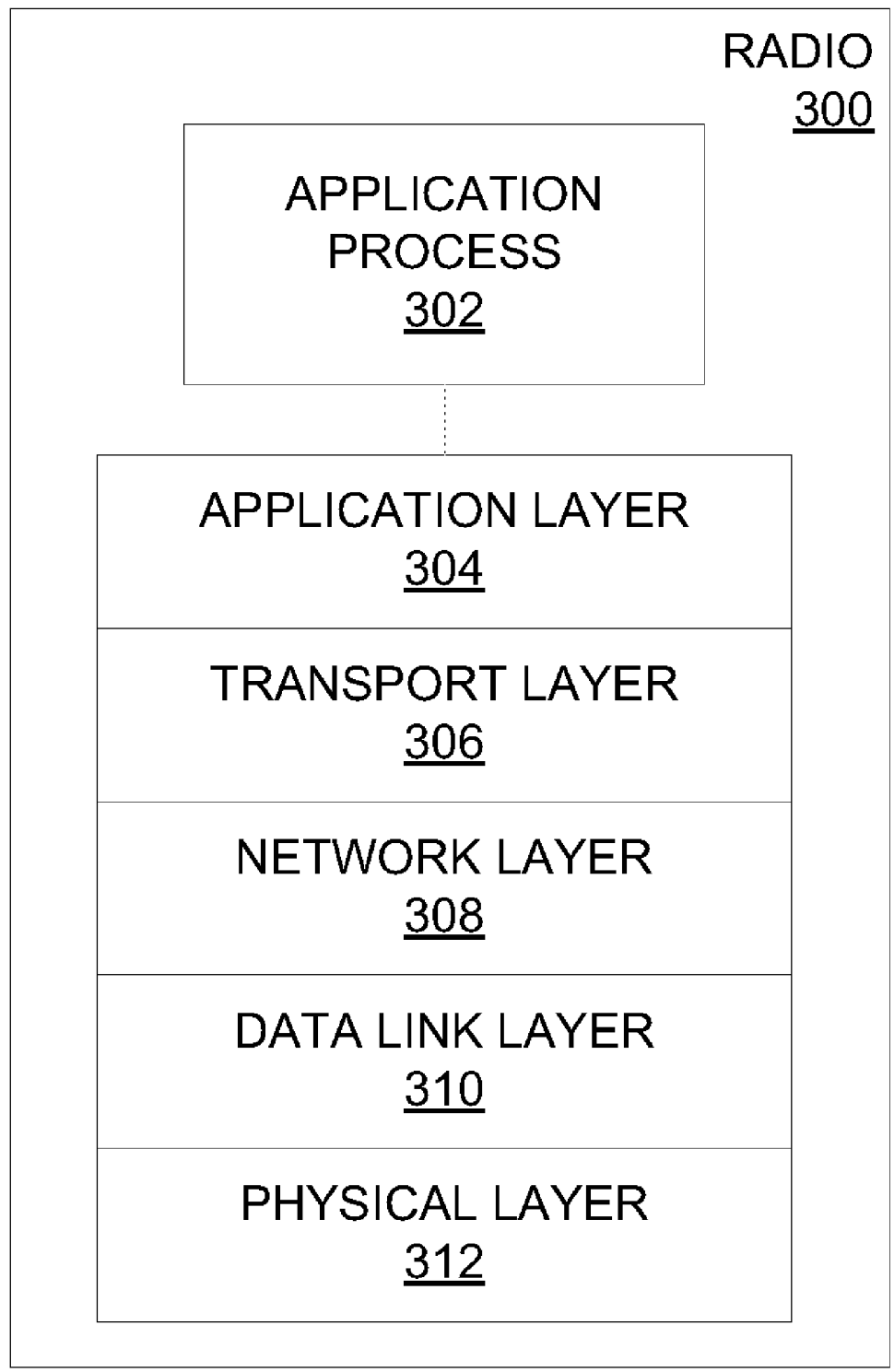
FIG. 3 illustrates an example network stack for use within a mesh radio.

FIG. 3 illustrates an example network stack for use within a mesh radio 300. The application process 302 may communicate with an application layer 304, a transport layer 306, a network layer 308, a data link layer 310 and a physical layer 312.

In the example of FIG. 3, the radio 300 may be a mesh radio installed in a mesh gate, a mesh device or an off-network device. For example, the radio 300 may be a component in a meter, a mesh gate, or any other mesh device configured to participate in a mesh network or communicate with other mesh devices. The radio 300 may be configured to transmit wireless signals over a predetermined or dynamically determined frequency to other radios.

In the example of FIG. 3, the application process 302 may be an executing application that requires information to be communicated over the network stack. For example, the application process 302 may be software supporting an AMI system, such as software executing on an electricity meter or a mesh gate.

In the example of FIG. 3, the application layer 304 interfaces directly with and performs common application services for application processes. Functionality includes semantic conversion between associated application processes. For example, the application layer may be implemented as ANSI C12.12/22.

In the example of FIG. 3, the transport layer 306 responds to service requests from the application layer and issues service requests to the Internet layer. It delivers data to the appropriate application on the host computers. For example, the layer may be implemented as TCP (Transmission Control Protocol), and UDP (User Datagram Protocol).

In the example of FIG. 3, the network layer 308 is responsible for end to end (source to destination) packet delivery. The layer's functionality includes transferring variable length data sequences from a source to a destination via one or more networks while maintaining the quality of service, and error control functions. Data will be transmitted from its source to its destination, even if the transmission path involves multiple hops. For example, the network layer 308 may translate a short address into a network address.

In the example of FIG. 3, the data link layer 310 transfers data between adjacent network nodes in a network, wherein the data is in the form of packets. The layer provides functionality including transferring data between network entities and error correction/detection. For example, the layer may be implemented as IEEE 802.15.4.

In the example of FIG. 3, the physical layer 312 may be the most basic network layer, transmitting bits over a data link connecting network nodes. No packet headers or trailers are included. The bit stream may be grouped into code words or symbols and converted to a physical signal, which is transmitted over a transmission medium, such as radio waves. The physical layer provides an electrical, mechanical, and procedural interface to the transmission medium. For example, the layer may be implemented as IEEE 802.15.4.

In the example of FIG. 3, in operation, the network stack provides different levels of abstraction for programmers within an AMI system. Abstraction reduces a concept to only information which is relevant for a particular purpose. Thus, each level of the network stack may assume the functionality below it on the stack is implemented. This facilitates programming features and functionality for the AMI system. The illustrated network stack may facilitate intra-mesh network communication by utilizing a short address to identify addressees.

FIG. 4A illustrates an example procedure for tree routing and route optimization in a mesh network. The procedure may execute on a mesh device participating in a mesh network. The procedure may allow the mesh device to transmit a message to the mesh gate via an optimal route. For example, the message may be a meter reading, a status report, a request, or any other communication. The procedure may also allow the mesh device to optimize the selected route over time as neighbor information is received and network situation changes.

In the example of FIG. 4A, in 4002, the mesh device may associate with a mesh network. The mesh device may attempt to detect nearby neighboring mesh devices or mesh gates, and transmit an association request. The association request may be forwarded by neighboring mesh devices to the mesh gate, and an association acknowledgement may be sent in response. The mesh device may then be associated with the mesh gate and thereafter participate in the mesh network as a node. Additional details regarding the association process are described in U.S. patent application Ser. No. 12/275,252 (TR0020) filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference.

In one embodiment, an association request can initiate a neighbor information exchange. The neighbor information exchange can include a signal quality in both directions. In some situations, it is possible to have a good signal quality from a first node to a second node in a mesh network, but bad signal quality from the second node to the first node.

After the initial association request, the mesh device will periodically transmit a keep-alive message to the mesh gate. Each keep-alive message will store a return path to the transmitting mesh device in a message header. This path can be saved at the mesh gate.

In the example of FIG. 4A, in 4004, the mesh device may receive neighbor information in a neighbor exchange with at least one neighbor. Mesh devices in the mesh network may periodically transmit neighbor information about themselves and their neighbors. For example, neighbor information may be transmitted at a random time within an interval, such as every 60 minutes. By transmitting at a random time, collisions are avoided within the mesh network. The neighbor information may include a next hop to the mesh gate, a path signal quality, and a number of hops to the mesh gate.

In the example of FIG. 4A, in 4006, the mesh device may optionally test whether the received neighbor information indicates a better neighbor. For example, the mesh device may compare entries in its neighbor information table with the received neighbor information. A neighbor may be associated with a score, calculated as a formula. For example, the formula may weight a path signal quality and a number of hops to the mesh gate to calculate the score. The mesh device may compare the calculated scores. If a better neighbor is available with a better score, the mesh device may proceed to 4008. If the neighbor information does not indicate a better neighbor, the mesh device may proceed to 4010.

In the example of FIG. 4A, in 4008, the mesh device may optionally update a neighbor information table entry. For example, the neighbor information table may be updated responsive to newly received neighbor information. For example, the neighbor information table may be updated if a better neighbor has been selected based on a better path to the mesh gate.

In the example of FIG. 4A, in 4010, the mesh device may optionally receive a transmission for forwarding. For example, the transmission may be received from a child mesh device that is further away from the mesh gate. The child mesh device may wish to transmit the message to the mesh gate and had selected the mesh device as the next mesh device.

In the example of FIG. 4A, in 4012, the mesh device may test whether a message is to be transmitted to the mesh gate. For example, the mesh device may receive a message for forwarding from a child mesh device, as discussed above. In an alternative, the mesh device may execute an application that requires a message to be transmitted to the mesh gate. For example, the application may need to report a meter sensor reading, a status update, or any other communication to the mesh gate. If a message is to be transmitted to the mesh gate, the mesh device may proceed to 4014. If no message is to be transmitted, the mesh device may continue to function as a node in the mesh network and proceed to 4004.

In the example of FIG. 4A, in 4014, the mesh device may select a next mesh device. For example, the next mesh device may be selected from the neighbor information table as being closer to the mesh gate and has an acceptable path score. For example, the path score may be determined, in part, based on a path signal quality and a number of hops to the mesh gate to calculate the score.

In the example of FIG. 4A, in 4016, the mesh device may optionally insert an address of the next mesh device in a message header. For example, the address of the next mesh device may be retrieved from the neighbor information table.

In the example of FIG. 4A, in 4018, the mesh device may transmit the message to the next mesh device. For example, the message may be broadcast on a mesh network frequency or channel and received by the next mesh device. The next mesh device may check the message header, extract the destination address, and verify it is the intended recipient of the message. The next message may also extract a flag indicating the message is to be forwarded to the mesh gate.

In the example of FIG. 4A, in 4020, the mesh device may optionally store a temporary path. For example, the temporary path may be stored as a temporary path table entry and include a transmitting mesh device and a receiving mesh device. The entry may be created when a message is received at the mesh device for forwarding. The mesh device stores the intended destination and the transmitting mesh device. The entry may be used when an optionally response is sent back from the destination mesh device. The mesh device looks up the temporary path table and retrieves the transmitting mesh device's address, and can therefore forward the response onwards.

In the example of FIG. 4A, in 4022, the mesh device may optionally test whether an acknowledgement was received. For example, the next mesh device may be configured to reply with an acknowledgement when the message is received. In this way, each mesh device is responsible for forwarding the message onwards to the next mesh device. If an acknowledgement was received, the mesh device may continue functioning as a node in the mesh network and proceed to 4004. If no acknowledgement was received, the mesh device may proceed to 4024.

In the example of FIG. 4A, in 4024, the mesh device may optionally select a second best mesh device from the neighbor information table. If the next mesh device has failed to transmit an acknowledgement, it may have failed and therefore be unable to forward the message. The mesh device may then select a second best mesh device to forward the message.

In the example of FIG. 4A, in 4026, the mesh device may optionally transmit the message to the second best mesh device. The second best mesh device's addresses may be added to the message header and the message broadcasted on the mesh network's channel or frequency.

In an alternative, if an acknowledgement is not received from the second best mesh device, the mesh device may continue attempting to transmit the message to alternative mesh devices in decreasing order of a path score.

In the example of FIG. 4A, in operation, a mesh device may transmit messages to the mesh gate and also forward messages from child mesh devices to the mesh gate. The messages are transmitted to the next mesh device, closer to the mesh gate, for further forwarding. The mesh device may provide retry functionality in case the next mesh device fails to acknowledge the message. The mesh device may also update its neighbor information table and select a more optimal next mesh device responsive to periodic neighbor information exchanges. In this way, simple mesh devices with limited computing resources will always have an optimal path over which to transmit a message to the mesh gate.

FIG. 4B illustrates an example procedure for source routing in a mesh network. The procedure may execute on a mesh gate participating in a mesh network. The procedure may allow the mesh gate to transmit a message to a target mesh device on the mesh network via an optimal route. For example, the message may be an instruction, a query, or any other communication.

In the example of FIG. 4B, in 4102, the mesh gate may associate with a mesh network. The mesh gate may reply with association acknowledgements when it receives association requests from nearby mesh devices. If a mesh device is not in direct radio contact with a mesh device, the association request and acknowledgement may be forwarded by a neighboring mesh device.

In the example of FIG. 4B, in 4104, the mesh gate may receive neighbor information from mesh devices within the mesh network. Mesh devices may periodically transmit neighbor information about themselves and their neighbors. For example, neighbor information may be transmitted at a random time within an interval, such as every 60 minutes. By transmitting at a random time, collusions are avoided within the mesh network. The neighbor information may include a next hop to the mesh gate, a path signal quality, and a number of hops to the mesh gate. The mesh gate may compile the neighbour information into a master neighbour information table.

In the example of FIG. 4B, in 4106, the mesh gate may optionally receive a transmission for forwarding. For example, the transmission may be received from a mesh device for forwarding to another mesh device. With the mesh gate's greater computing resources and complete neighbor information for each mesh device in the network, having the mesh gate route all inter-mesh device communications may improve performance.

In the example of FIG. 4B, in 4108, the mesh gate may test whether a message is to be transmitted to the target mesh device. For example, the mesh gate may receive a message for forwarding from a source mesh device, as discussed above. In an alternative, the mesh gate may execute an application that requires a message to be transmitted to the target mesh device. For example, the application may transmit a query, a mesh device instruction, or any other communication. If a message is to be transmitted to the target mesh device, the mesh gate may proceed to 4110. If no message is to be transmitted, the mesh gate may continue to function in the mesh network and proceed to 4104.

In the example of FIG. 4B, in 4110, the mesh gate may determine a mesh network path to the target mesh device. For example, the mesh gate may look up the target mesh device's neighbor information table and execute a tree routing routine to determine an optimal path from the target mesh device to the mesh gate. Because the neighbor information table for each mesh device in the mesh network is stored in the mesh gate, calculating the optimal path is straightforward. The route will then be reversed for the optimal path from the mesh gate to the target mesh device.

In the example of FIG. 4B, in 4112, the mesh gate may optionally insert an address of the next mesh device in a message header. The mesh gate may also insert the complete path with addresses of each intermediate mesh device in the message header or as part of the message body.

In the example of FIG. 4B, in 4114, the mesh device may transmit the message to the next mesh device. For example, the message may be broadcasted on a mesh network frequency or channel and received by the next mesh device. The next mesh device may check the message header, extract the destination address, and verify it is the intended recipient of the message. The next message may also extract a flag indicating the message is to be forwarded to the target mesh device, and therefore extract an address of the next mesh device from the message header or body and insert it into the message header. The next mesh device may then forward the message onwards.

In the example of FIG. 4B, in 4116, the mesh gate may optionally test whether an acknowledgement was received. For example, the next mesh device may be configured to reply with an acknowledgement when the message is received. In this way, each mesh device is responsible for forwarding the message onwards to the next mesh device. If an acknowledgement was received, the mesh gate may continue functioning in the mesh network and proceed to 4108. If no acknowledgement was received, the mesh gate may proceed to 4118, where an alternative mesh device is selected for a retry.

In the example of FIG. 4B, in 4118, the mesh gate may optionally select a second best mesh device from the neighbor information table. If the next mesh device has failed to transmit an acknowledgement, it may have failed and therefore be unable to forward the message. The mesh gate may then select a second best mesh device to forward the message.

In the example of FIG. 4B, in 4120, the mesh gate may optionally transmit the message to the second best mesh device. An alternative mesh network path may be calculated including the second best mesh device and added to the message. The second best mesh device's addresses may be added to the message header and the message broadcasted on the mesh network's channel or frequency.

In an alternative, if an acknowledgement is not received from the second best mesh device, the mesh gate may continue attempting to transmit the message to alternative mesh devices in decreasing order of a path score.

In the example of FIG. 4B, in operation, a mesh gate may transmit messages to the target mesh device and also forward any messages to the target mesh device. The messages are transmitted to the next mesh device, closer to the target mesh device, for further forwarding. The mesh gate may provide retry functionality in case the next mesh device fails to acknowledge the message. The mesh gate may also update a master neighbor information table responsive to periodic neighbor information exchanges.

FIG. 4C illustrates an example procedure for mesh routing scheme in a mesh network. The procedure may execute on a mesh device participating in a mesh network. The procedure may allow the mesh device to transmit a message to a target mesh device via an optimal route. For example, the message may be a mesh device instruction, a status report, a request, or any other communication. In one example, a thermostat may transmit a temperature setting to a heater. In another example, an electricity meter may transmit real-time electricity consumption to a display unit.

In the example of FIG. 4C, in 4202, the mesh device may associate with a mesh network. The mesh device may attempt to detect nearby neighboring mesh devices or mesh gates, and transmit an association request. The association request may be forwarded by neighboring mesh devices to the mesh gate, and an association acknowledgement may be sent in response. The mesh device may then be associated with the mesh gate and thereafter participate in the mesh network as a node.

In the example of FIG. 4C, in 4204, the mesh device may receive neighbor information in a neighbor exchange with at least one neighbor. Mesh devices in the mesh network may periodically transmit neighbor information about themselves and their neighbors. For example, neighbor information may be transmitted at a random time within an interval, such as every 60 minutes. By transmitting at a random time, collisions are avoided within the mesh network. The neighbor information may include a next hop to the mesh gate, a path signal quality, and a number of hops to the mesh gate.

In the example of FIG. 4C, in 4206, the mesh device may optionally receive a transmission for forwarding. For example, the transmission may be received from a child mesh device that is further away from the target mesh device. The child mesh device may wish to transmit the message to the target mesh device and had selected the mesh device as the next mesh device.

In the example of FIG. 4C, in 4208, the mesh device may test whether a message is to be transmitted to the target mesh device. For example, the mesh device may receive a message for forwarding from a child mesh device, as discussed above. In an alternative, the mesh device may execute an application that requires a message to be transmitted to the target mesh device. For example, the application may need to transmit a meter sensor reading, a status update, or any other communication. If a message is to be transmitted to the target mesh device, the mesh device may proceed to 4210. If no message is to be transmitted, the mesh device may continue to function as a node in the mesh network and proceed to 4204.

In the example of FIG. 4C, in 4210, the mesh device may execute a route discovery routine. For example, the route discovery may include a broadcasted request for a path to the target mesh device. Every mesh device that receives the requests checks if it is the target mesh device. If yes, it replies, and its answer is forwarded back to the mesh device with the path. If no, the request may be re-broadcasted. This may result in one or more routes to the target mesh device.

In one embodiment, route discovery can restrict re-broadcasting by signal quality. For example, in a first pass, mesh devices will only re-broadcast to neighbors where a signal exceeds a first threshold. In subsequent passes, the threshold is lowered. In this way, a highest quality signal quality path will be found.

In the example of FIG. 4C, in 4212, the mesh device may select a next mesh device. From the one or more routes discovered above, one path may be selected based on a path score. For example, the path score may be determined, in part, based on a path signal quality and a number of hops.

In the example of FIG. 4C, in 4214, the mesh device may optionally insert an address of the next mesh device in a message header. For example, the address of the next mesh device may be retrieved from the neighbor information table.

In the example of FIG. 4C, in 4216, the mesh device may transmit the message to the next mesh device. For example, the message may be broadcasted on a mesh network frequency or channel and received by the next mesh device. The next mesh device may check the message header, extract the destination address, and verify it is the intended recipient of the message. The next message may also extract a flag indicating the message is to be forwarded to the mesh gate.

In the example of FIG. 4C, in 4218, the mesh device may optionally store a temporary path. For example, the temporary path may be stored as a temporary path table entry and include a transmitting mesh device and a receiving mesh device. The entry may be created when a message is received at the mesh device for forwarding. The mesh device stores the intended destination and the transmitting mesh device. The entry may be used when an optionally response is sent back from the destination mesh device. The mesh device looks up the temporary path table and retrieves the transmitting mesh device's address, and can therefore forward the response onwards.

In the example of FIG. 4C, in operation, a mesh device may transmit messages to the target mesh device and also forward messages from child mesh devices to the target mesh device. The messages are transmitted to the next mesh device, closer to the target mesh device, for further forwarding along a discovered route.

In an alternative, the route discovery may be executed by a mesh gate accessing the neighbor information of all mesh devices within the mesh network. In this example, the mesh gate may transmit messages to each mesh device along the path, the messages including an entry for the temporary path table of each mesh device to create the mesh route.

In the above procedures, a neighbor exchange can be used to update neighbor information and routing tables. Each mesh device associated with a mesh network periodically generates and transmits a neighbor exchange message that is broadcasted to nearby mesh devices. Each receiving mesh device will also determine a signal quality of the received broadcast, which is stored in a neighborhood table associated with the transmitting mesh device.

An access point such as a NAN-WAN gate and also described as a mesh gate in this and in related applications, may perform any one or more of many different functions including for example, but not limited to, one or any combination of: relaying information from a server (such as to a head end server) to the mesh network nodes, routing information, aggregating information from the nodes and microportals within any sub-network that may be configured for transmission to a server (such as to the head end server), acting as a HAN coordinator, acting as a NAN-WAN gate, transmitting firmware upgrades, and/or multicasting messages. A mesh gate may also be referred to as a collector because it collects information from the NAN-associated or other nodes and/or microportals in its sub-network.

Although the above embodiments have been discussed with reference to specific example embodiments, it will be evident that the various modification, combinations and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of optimizing communication paths within a mesh network, comprising:
    initiating a mesh network, the mesh network including at least one mesh device;
    receiving registration information from each mesh device of the mesh network;

storing mesh device information in an accessible memory;
responsive to a predetermined trigger, calculating an optimal path from each mesh device, wherein the optimal path includes a set of mesh device addresses corresponding to a set of mesh devices along which a message can be forwarded;
transmitting the calculated optimal path to each mesh device;
receiving, by the at least one mesh device, a request to transmit a message to a next mesh device; and
identifying, by the at least one mesh device, the next mesh device from among a plurality of neighbor mesh devices, wherein identifying the next mesh device further comprises calculating, by the at least one mesh device, a score for a next mesh device according to the calculated optimal path, and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path.

2. The method of claim 1, wherein the predetermined trigger is selected from the set consisting of a time, a period, the occurrence of an event, the non-occurrence of an event, or any combination of two or more of these.

3. The method of claim 1, further comprising:
storing the associated optimal path in the accessible memory for each mesh device.

4. The method of claim 1, further comprising:
receiving a message from a mesh device transmitted along the associated optimal path.

5. The method of claim 1, wherein the optimal path is calculated, in part, based on: a next hop to an access point, a path signal quality, and a number of hops to the access point.

6. A system for optimizing communication paths within a mesh network, comprising:
a mesh network including at least one mesh device;
a receiver receiving registration information from each mesh device of the mesh network;
a memory storage for storing mesh device information in an accessible memory;
a processor logic, responsive to a predetermined trigger, for calculating an optimal path from each mesh device, wherein the optimal path includes a set of mesh device addresses corresponding to a set of mesh devices along which a message can he forwarded;
a transmitter for transmitting the calculated optimal path to each mesh device; and
a processor logic for the at least one mesh device, responsive to receiving a request to transmit a message to a next mesh device, for identifying the next mesh device from among a plurality of neighbor mesh devices, wherein identifying the next mesh device further comprises calculating a score for a next mesh device according to the calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path.

7. The system of claim 6, wherein the predetermined trigger is selected from the set consisting of a time, a period, the occurrence of an event, the non-occurrence of an event, or any combination of two or more of these.

8. The system of claim 6, further comprising:
a memory control logic for storing the associated optimal path in the accessible memory for each mesh device.

9. The system of claim 6, wherein:
the receiver is adapted for receiving a message from a mesh device transmitted along the associated optimal path.

10. The system of claim 6, wherein the optimal path is calculated, in part, based on: a next hop to an access point, a path signal quality, and a number of hops to the access point.

11. A non-transitory computer readable storage medium with an executable program stored thereon, wherein the program instructs a processor to perform the following steps of a method for optimizing communication paths within a mesh network, comprising:
initiating a mesh network, the mesh network including at least one mesh device;
receiving registration information from each mesh device of the mesh network;
storing mesh device information in an accessible memory;
responsive to a predetermined trigger, calculating an optimal path from each mesh device, wherein the optimal path includes a set of mesh device addresses corresponding to a set of mesh devices along which a message can be forwarded;
transmitting the calculated optimal path to each mesh device; and
responsive to receiving a request to transmit a message to a next mesh device, identifying the next mesh device from among a plurality of neighbor mesh devices, wherein identifying the next mesh device further comprises calculating a score for a next mesh device according to the calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path.

12. The non-transitory computer readable storage medium of claim 11, wherein the predetermined trigger is selected from the set consisting of a time, a period, the occurrence of an event, the non-occurrence of an event, or any combination of two or more of these.

13. The non-transitory computer readable storage medium of claim 11, further comprising:
storing the associated optimal path in the accessible memory for each mesh device.

14. The non-transitory computer readable storage medium of claim 11, further comprising:
receiving a message from a mesh device transmitted along the associated optimal path.

15. The non-transitory computer readable storage medium of claim 11, wherein the optimal path is calculated, in part, based on: a next hop to an access point, a path signal quality, and a number of hops to the access point.

16. A method for transmitting a message over a mesh network via a routing, the method comprising:

associating a first mesh device with a mesh network, the mesh network managed by an access point;
identifying a next mesh device from among a plurality of neighbor mesh devices;
wherein identifying the next mesh device further comprises calculating, by the first mesh device, a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path; and
transmitting the message to the identified next mesh device.

17. The method in claim 16, wherein the identifying a next mesh device from among a plurality of neighbor mesh devices comprises:
receiving neighbor information from a set of neighboring mesh devices; and
identifying the next mesh device by selecting a next mesh device from the set of neighboring mesh devices in response to a request to transmit a message to the access point, wherein the next mesh device is closer to the access point.

18. The method in claim 16, further comprising optimizing communication paths within a mesh network, comprising:
initiating a mesh network, the mesh network including at least one mesh device;
receiving registration information from each mesh device of the mesh network;
storing mesh device information in an accessible memory;
responsive to predetermined trigger, calculating an optimal path from each mesh device, wherein the optimal path includes a set of mesh device addresses corresponding to a set of mesh devices along which a message can be forwarded; and
transmitting the calculated optimal path to each mesh device.

19. A method for transmitting a message over a mesh network via a routing, the method comprising:
associating a first mesh device with a mesh network, the mesh network managed by an access point;
identifying a next mesh device from among a plurality of neighbor mesh devices, the next mesh device being identified by one of:
(i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point;
(ii) using source routing comprising: identifying the next mesh device by receiving a next mesh device address from the access point, wherein the next mesh device is part of an optimal path to the access point; or
(iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device; and
wherein identifying the next mesh device further comprises calculating, by the first mesh device, a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the stored calculated optimal path and the alternative next mesh device according to the alternate optimal path.

20. The method in claim 19, further comprising transmitting the message to the identified next mesh device.

21. The method in claim 19, further comprising optimizing communication paths within a mesh network, comprising:
initiating a mesh network, the mesh network including at least one mesh device;
receiving registration information from each mesh device of the mesh network;
storing mesh device information in an accessible memory;
responsive to predetermined trigger, calculating an optimal path from each mesh device, wherein the optimal path includes a set of mesh device addresses corresponding to a set of mesh devices along which a message can be forwarded; and
transmitting the calculated optimal path to each mesh device.

22. A system for transmitting a message over a mesh network, the system comprising:
means for associating a first mesh device with a mesh network, the mesh network managed by an access point;
means for identifying a next mesh device from among a plurality of neighbor mesh devices, the next mesh device being identified by one of:
(i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point;
(ii) using source routing comprising: identifying the next mesh device by receiving a next mesh device address from the access point, wherein the next mesh device is part of an optimal path to the access point; or
(iii) using mesh routing comprising: broadcasting an optimal path query to neighboring mesh devices in response to a request to transmit a message to a receiving mesh device; receiving replies from the neighboring mesh devices at the first mesh device; and identifying the next mesh device by selecting a next mesh device by calculating an optimal path, the optimal path including an address of a next mesh device; and
wherein the means for identifying the next mesh device further comprises means for calculating, by the first mesh device, a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the stored calculated optimal path and the alternative next mesh device according to the alternate optimal path.

23. The system in claim 22, further comprising a transmitter for transmitting the message to the identified next mesh device.

24. The system in claim 22, further comprising means for optimizing communication paths within the mesh network comprising:
   a receiver receiving registration information from each mesh device of the mesh network;
   a memory storage for storing mesh device information in an accessible memory;
   a processor logic, responsive to predetermined trigger, for calculating an optimal path from each mesh device, wherein the optimal path includes a set of mesh device addresses corresponding to a set of mesh devices along which a message can be forwarded; and
   a transmitter for transmitting the calculated optimal path to each mesh device.

25. A non-transitory computer readable storage medium with an executable program stored thereon, wherein the program instructs a processor to perform the following steps of a method for transmitting a message over a mesh network, the method comprising:
   associating a first mesh device with a mesh network, the mesh network managed by an access point;
   identifying a next mesh device from among a plurality of neighbor mesh devices, the next mesh device being identified by one of:
      (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point;
      (ii) using source routing comprising: identifying the next mesh device by receiving a next mesh device address from the access point, wherein the next mesh device is part of an optimal path to the access point; or
      (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device; and
   wherein identifying the next mesh device further comprises calculating by the first mesh device, a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the stored calculated optimal path and the alternative next mesh device according to the alternate optimal path.

26. The non-transitory computer readable storage medium in claim 25, further wherein the method further comprising transmitting the message to the identified next mesh device.

27. The non-transitory computer readable storage medium in claim 25, wherein the method further comprising optimizing communication paths within a mesh network comprising:
   receiving registration information from each mesh device of the mesh network;
   storing mesh device information in an accessible memory;
   responsive to predetermined trigger, calculating an optimal path from each mesh device, wherein the optimal path includes a set of mesh device addresses corresponding to a set of mesh devices along which a message can be forwarded; and
   transmitting the calculated optimal path to each mesh device.

28. A method for transmitting a message over a mesh network via tree routing, comprising:
   associating a first flesh device with a mesh network, the mesh network managed by an access point;
   receiving neighbor information at the first mesh device from a set of neighboring mesh devices;
   responsive to a request to transmit a message to the access point, selecting a next mesh device from the set of neighboring mesh devices, wherein the next mesh device is closer to the access point;
   wherein selecting the next mesh device further comprises calculating, by the first mesh device, a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path; and
   transmitting the message to the next mesh device.

29. The method of claim 28, further comprising:
   receiving a message from a sending mesh device for forwarding, wherein the request to transmit the message to the access point is indicated in a header of the message; and
   replying to the sending mesh device with an acknowledgement after the message has been transmitted.

30. The method of claim 29, further comprising:
   storing a temporary path in an accessible memory, wherein the temporary path includes an address of the sending mesh device and an address of the next mesh device.

31. The method of claim 30, further comprising:
   receiving a reply from the next mesh device;
   retrieving the temporary path from the accessible memory; and
   forwarding the reply to the sending mesh device.

32. The method of claim 29, wherein the neighbor information includes: a next hop to the access point, a path signal quality, and a number of hops to the access point.

33. The method of claim 29, further comprising:
   responsive to a failure to receive an acknowledgement for the transmitted message, selecting a second best mesh device from the set of neighboring mesh devices and transmitting the message to the second best mesh device.

34. The method of claim 29, further comprising:
   responsive to receiving the neighbor information, updating a neighbor information table in accessible memory.

35. A system for transmitting a message over a mesh network via tree routing, comprising:
- an association logic unit for associating a first mesh device with a mesh network, the mesh network managed by an access point;
- a receiver for receiving neighbor information from a set of neighboring mesh devices;
- a selection logic unit responsive to a request to transmit a message to the access point, selecting a next mesh device from the set of neighboring mesh devices, wherein the next mesh device is closer to the access point;
- the selection logic unit, further calculating a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path; and
- a transmitter for transmitting the message to the next mesh device.

36. The system of claim 35, wherein:
- the receiver is adapted for receiving a message from a sending mesh device for forwarding, wherein the request to transmit the message to the access point is indicated in a header of the message; and
- the receiver of the sending mesh device being adapted to receive a reply with an acknowledgement after the message to the next mesh device has been transmitted.

37. The system of claim 36, further comprising:
- a memory storage for storing a temporary path in an accessible memory, wherein the temporary path includes an address of the sending mesh device and an address of the next mesh device.

38. The system of claim 37, further comprising:
- a memory control logic for retrieving the temporary path from the accessible memory; and
- the receiver is adapted to receive a reply from the next mesh device, retrieve the temporary path from the accessible memory; and forward the reply to the sending mesh device.

39. The system of claim 35, wherein the neighbor information includes: a next hop to the access point, a path signal quality, and a number of hops to the access point.

40. The system of claim 35, further comprising:
- means responsive to a failure to receive an acknowledgement for the transmitted message, for selecting a second best mesh device from the set of neighboring mesh devices and transmitting the message to the second best mesh device.

41. The system of claim 35, further comprising:
- means responsive to receiving the neighbor information, for updating a neighbor information table in accessible memory.

42. A non-transitory computer storage medium with an executable program stored thereon, wherein the program instructs a processor to perform the following steps of a method for transmitting a message over a mesh network via tree routing, the method comprising:
- associating a first mesh device with a mesh network, the mesh network managed by an access point;
- receiving neighbor information at the first mesh device from a set of neighboring mesh devices;
- responsive to a request to transmit a message to the access point, selecting a next mesh device from the set of neighboring mesh devices, wherein the next mesh device is closer to the access point;
- wherein selecting the next mesh device further comprises calculating a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path; and
- transmitting the message to the next mesh device.

43. The non-transitory computer readable storage medium of claim 42, wherein the method further comprising:
- receiving a message from a sending mesh device fur forwarding, wherein the request to transmit the message to the access point is indicated in a header of the message; and
- replying to the sending mesh device with an acknowledgement after the message has been transmitted.

44. The non-transitory computer readable storage medium of claim 43, wherein the method further comprising:
- storing a temporary path in an accessible memory, wherein the temporary path includes an address of the sending mesh device and an address of the next mesh device.

45. The non-transitory computer readable storage medium of claim 44, wherein the method further comprising:
- receiving a reply from the next mesh device;
- retrieving the temporary path from the accessible memory; and
- forwarding the reply to the sending mesh device.

46. The non-transitory computer readable storage medium of claim 42, wherein the neighbor information includes: a next hop to the access point, a path signal quality, and a number of hops to the access point.

47. The non-transitory computer readable storage medium of claim 42, further comprising:
- responsive to a failure to receive an acknowledgement for the transmitted message, selecting a second best mesh device from the set of neighboring mesh devices and transmitting the message to the second best mesh device.

48. The non-transitory computer readable storage medium of claim 42, further comprising:
- responsive to receiving the neighbor information, updating a neighbor information table in accessible memory.

49. A system for transmitting a message over a mesh network via tree routing, comprising:
- means for associating a first mesh device with a mesh network, the mesh network managed by an access point;
- means for receiving neighbor information at the first mesh device from a set of neighboring mesh devices;
- means responsive to a request for transmitting a message to the access point, selecting a next mesh device from the set of neighboring mesh devices, wherein the next mesh device is closer to the access point;
- wherein the selection means further comprises means for calculating a score for the next mesh device according to a stored calculated optimal path and a score for an alternative next mesh device according to an alternate optimal path based on at least a link quality index corresponding to signal quality of the alternate optimal path, the link quality index included in neighbor information received in a neighbor exchange from at least one neighbor mesh device and selecting, based on a comparison of the calculated scores, one of the next mesh device according to the calculated optimal path and the alternative next mesh device according to the alternate optimal path; and means for transmitting the message to the next mesh device.

50. The system of claim 49, further comprising:

means for receiving a message from a sending mesh device for forwarding, wherein the request to transmit the message to the access point is indicated in a header of the message; and means for replying to the sending mesh device with an acknowledgement after the message has been transmitted.

51. The system of claim 50, further comprising:

means for storing a temporary path in an accessible memory, wherein the temporary path includes an address of the sending mesh device and an address of the next mesh device.

52. The system of claim 51, further comprising:

means for receiving a reply from the next mesh device;

means for retrieving the temporary path from the accessible memory; and means for forwarding the reply to sending mesh device.

53. The system of claim 49, wherein the neighbor information includes: a next hop to the access point, a path signal quality, and a number of hops to the access point.

54. The system of claim 49, farther comprising:

means for responsive to a failure to receive an acknowledgement for the transmitted message, for selecting a second best mesh device from the set of neighboring mesh devices and transmitting the message to the second best mesh device.

55. The system of claim 49, further comprising:

means for responsive for receiving the neighbor information, updating a neighbor information table in accessible memory.

* * * * *